(12) United States Patent
Liu

(10) Patent No.: US 11,729,525 B2
(45) Date of Patent: *Aug. 15, 2023

(54) DIGITAL PIXEL ARRAY WITH MULTI-STAGE READOUTS

(71) Applicant: Meta Platforms Technologies, LLC, Menlo Park, CA (US)

(72) Inventor: Xinqiao Liu, Medina, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/363,915

(22) Filed: Jun. 30, 2021

(65) Prior Publication Data
US 2021/0329189 A1    Oct. 21, 2021

Related U.S. Application Data

(63) Continuation of application No. 16/255,528, filed on Jan. 23, 2019, now Pat. No. 11,057,581.
(Continued)

(51) Int. Cl.
*H04N 25/59* (2023.01)
*H04N 25/67* (2023.01)
(Continued)

(52) U.S. Cl.
CPC ........... *H04N 25/59* (2023.01); *H04N 25/583* (2023.01); *H04N 25/67* (2023.01); *H04N 25/713* (2023.01);
(Continued)

(58) Field of Classification Search
CPC .. H04N 5/3559; H04N 5/35554; H04N 5/365; H04N 5/37213; H04N 5/37452;
(Continued)

(56) References Cited

U.S. PATENT DOCUMENTS 7,362,365 B1  4/2008 Reyneri et al.
8,134,623 B2  3/2012 Purcell et al.
(Continued)

FOREIGN PATENT DOCUMENTS

CN    103207716 A    7/2013
CN    104125418 A    10/2014
(Continued)

OTHER PUBLICATIONS

International Search Report and Written Opinion for International Application No. PCT/US2019/014904, dated Aug. 5, 2019, 7 Pages.
(Continued)

*Primary Examiner* — Lin Ye
*Assistant Examiner* — Tuan H Le
(74) *Attorney, Agent, or Firm* — Kilpatrick Townsend & Stockton LLP

(57) ABSTRACT

Examples of an apparatus are disclosed. In some example, an apparatus may include an array of digital pixel cells, each digital pixel cell including a photodiode and a memory device to store a digital output generated based on charge generated by the photodiode in an exposure period. The apparatus may also include an image processor configured to: receive first digital outputs from the memory devices of a first set of digital pixel cells of the array of digital pixel cells; determine, from the first set of digital pixel cells, a second set of digital pixel cells of which the first digital outputs satisfy one or more pre-determined conditions; identify, based on the second set of digital pixel cells, a third set of digital pixel cells; receive the second digital outputs generated by the third set of digital pixel cells; and perform image processing operations based on the second digital outputs.

20 Claims, 21 Drawing Sheets

Related U.S. Application Data

(60) Provisional application No. 62/621,336, filed on Jan. 24, 2018.

(51) Int. Cl.
*H04N 25/75* (2023.01)
*H04N 25/583* (2023.01)
*H04N 25/713* (2023.01)
*H04N 25/771* (2023.01)
*H04N 25/772* (2023.01)
*G02B 27/01* (2006.01)
*G02B 30/00* (2020.01)

(52) U.S. Cl.
CPC ........... *H04N 25/75* (2023.01); *H04N 25/771* (2023.01); *H04N 25/772* (2023.01); *G02B 27/017* (2013.01); *G02B 30/00* (2020.01); *G02B 2027/0178* (2013.01)

(58) Field of Classification Search
CPC .... H04N 5/37455; H04N 5/378; H04N 5/341; H04N 5/33; G02B 27/017; G02B 30/00; G02B 2027/0178; G06F 3/0346
See application file for complete search history.

(56) References Cited

U.S. PATENT DOCUMENTS

| | | | |
|---|---|---|---|
| 8,779,346 | B2 | 7/2014 | Fowler et al. |
| 9,001,251 | B2 | 4/2015 | Smith et al. |
| 9,094,629 | B2 | 7/2015 | Ishibashi |
| 9,282,264 | B2 | 3/2016 | Park et al. |
| 9,363,454 | B2 | 6/2016 | Ito et al. |
| 10,726,627 | B2 | 7/2020 | Liu |
| 11,057,581 | B2 * | 7/2021 | Liu .................. H04N 5/378 |
| 2003/0020100 | A1 | 1/2003 | Guidash |
| 2005/0057389 | A1 | 3/2005 | Krymski |
| 2007/0222881 | A1 | 9/2007 | Mentzer |
| 2009/0244346 | A1 | 10/2009 | Funaki |
| 2009/0245637 | A1 | 10/2009 | Barman et al. |
| 2009/0321615 | A1 | 12/2009 | Sugiyama et al. |
| 2010/0276572 | A1 | 11/2010 | Iwabuchi et al. |
| 2011/0254986 | A1 | 10/2011 | Nishimura et al. |
| 2012/0133807 | A1 | 5/2012 | Wu et al. |
| 2012/0212465 | A1 | 8/2012 | White et al. |
| 2012/0262616 | A1 | 10/2012 | Sa et al. |
| 2013/0056809 | A1 | 3/2013 | Mao et al. |
| 2013/0057742 | A1 | 3/2013 | Nakamura et al. |
| 2013/0141619 | A1 | 6/2013 | Lim et al. |
| 2013/0207219 | A1 | 8/2013 | Ahn |
| 2013/0299674 | A1 | 11/2013 | Fowler et al. |
| 2014/0042299 | A1 | 2/2014 | Wan et al. |
| 2014/0368687 | A1 | 12/2014 | Yu et al. |
| 2015/0189209 | A1 | 7/2015 | Yang et al. |
| 2015/0201142 | A1 | 7/2015 | Smith et al. |
| 2015/0229859 | A1 | 8/2015 | Guidash et al. |
| 2015/0279884 | A1 | 10/2015 | Kusumoto |
| 2015/0309316 | A1 | 10/2015 | Osterhout et al. |
| 2015/0312502 | A1 | 10/2015 | Borremans |
| 2015/0358571 | A1 | 12/2015 | Dominguez Castro et al. |
| 2015/0381911 | A1 | 12/2015 | Shen et al. |
| 2016/0011422 | A1 | 1/2016 | Thurber et al. |
| 2016/0018645 | A1 | 1/2016 | Haddick et al. |
| 2016/0028974 | A1 | 1/2016 | Guidash et al. |
| 2016/0088253 | A1 | 3/2016 | Tezuka |
| 2016/0100115 | A1 | 4/2016 | Kusano |
| 2016/0165160 | A1 | 6/2016 | Hseih et al. |
| 2016/0197117 | A1 | 7/2016 | Nakata et al. |
| 2016/0360127 | A1 | 12/2016 | Dierickx et al. |
| 2017/0039906 | A1 | 2/2017 | Jepsen |
| 2017/0228345 | A1 | 8/2017 | Gupta et al. |
| 2017/0272768 | A1 | 9/2017 | Tall et al. |
| 2017/0280031 | A1 | 9/2017 | Price et al. |
| 2017/0324917 | A1 | 11/2017 | Mlinar et al. |
| 2017/0339327 | A1 | 11/2017 | Koshkin et al. |
| 2018/0136471 | A1 | 5/2018 | Miller et al. |
| 2018/0167575 | A1 | 6/2018 | Watanabe et al. |
| 2018/0276841 | A1 | 9/2018 | Krishnaswamy et al. |
| 2019/0035154 | A1 | 1/2019 | Liu |
| 2019/0098232 | A1 | 3/2019 | Mori et al. |
| 2020/0053299 | A1 | 2/2020 | Zhang et al. |

FOREIGN PATENT DOCUMENTS

| | | |
|---|---|---|
| CN | 104204904 A | 12/2014 |
| CN | 104704812 A | 6/2015 |
| CN | 105706439 A | 6/2016 |
| CN | 106255978 A | 12/2016 |
| CN | 106791504 A | 5/2017 |
| CN | 109298528 A | 2/2019 |
| EP | 1746820 A1 | 1/2007 |
| EP | 2804074 A2 | 11/2014 |
| WO | 2014055391 A2 | 4/2014 |
| WO | 2017013806 A1 | 1/2017 |

OTHER PUBLICATIONS

Non-Final Office Action dated Sep. 2, 2021 for U.S. Appl. No. 16/910,844, filed Jun. 24, 2020, 7 Pages.
Notice of Allowance dated Dec. 22, 2021 for U.S. Appl. No. 16/910,844, filed Jun. 24, 2020, 7 pages.
Notice of Allowance dated Nov. 24, 2021 for U.S. Appl. No. 16/910,844, filed Jun. 24, 2020, 8 pages.
Notification of the First Office Action dated Oct. 28, 2021 for Chinese Application No. 2019800218483, filed Jan. 24, 2019, 17 pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
International Search Report and Written Opinion for International Application No. PCT/US2021/031201, dated Aug. 2, 2021, 13 Pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Office Action dated Jul. 3, 2020 for Chinese Application No. 201810821296, filed Jul. 24, 2018, 17 Pages.
Office Action dated Mar. 9, 2021 for Chinese Application No. 201810821296, filed Jul. 24, 2018, 10 Pages.
Office Action dated Jun. 28, 2020 for Chinese Application No. 201810821296, filed Jul. 24, 2018, 2 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
U.S. Appl. No. 15/847,517, "Non-Final Office Action", dated Nov. 23, 2018, 21 pages.
U.S. Appl. No. 15/909,162, "Non-Final Office Action", dated Jul. 25, 2019, 20 pages.
U.S. Appl. No. 15/909,162, "Notice of Allowance", dated Mar. 18, 2020, 9 pages.
U.S. Appl. No. 16/255,528, "Corrected Notice of Allowability", dated Apr. 9, 2021, 5 pages.
U.S. Appl. No. 16/255,528, "Final Office Action", dated Jan. 27, 2021, 31 pages.

(56) References Cited

OTHER PUBLICATIONS

U.S. Appl. No. 16/255,528, "Non-Final Office Action", dated Jul. 10, 2020, 27 pages.
U.S. Appl. No. 16/255,528, "Notice of Allowance", dated Apr. 1, 2021, 7 pages.
Cho, et al., "A Low Power Dual CDS for a Column-Parallel CMOS Image Sensor", Journal of Semiconductor Technology and Science, vol. 12, No. 4, Dec. 30, 2012, pp. 388-396.
EP18179838.0, "Partial European Search Report", dated Dec. 5, 2018, 14 pages.
EP18179846.3, "Extended European Search Report", dated Dec. 7, 2018, 10 pages.
EP18179851.3, "Extended European Search Report", dated Dec. 7, 2018, 8 pages.
EP19743908.6, "Extended European Search Report", dated Sep. 30, 2020, 9 pages.
PCT/US2018/039350, "International Search Report and Written Opinion", dated Nov. 15, 2018, 13 pages.
PCT/US2018/039352, "International Search Report and Written Opinion", dated Oct. 26, 2018, 10 pages.
PCT/US2018/039431, "International Search Report and Written Opinion", dated Nov. 7, 2018, 14 pages.
Office Action dated Apr. 28, 2022 for Taiwan Application No. 20190102703, 32 pages.

* cited by examiner

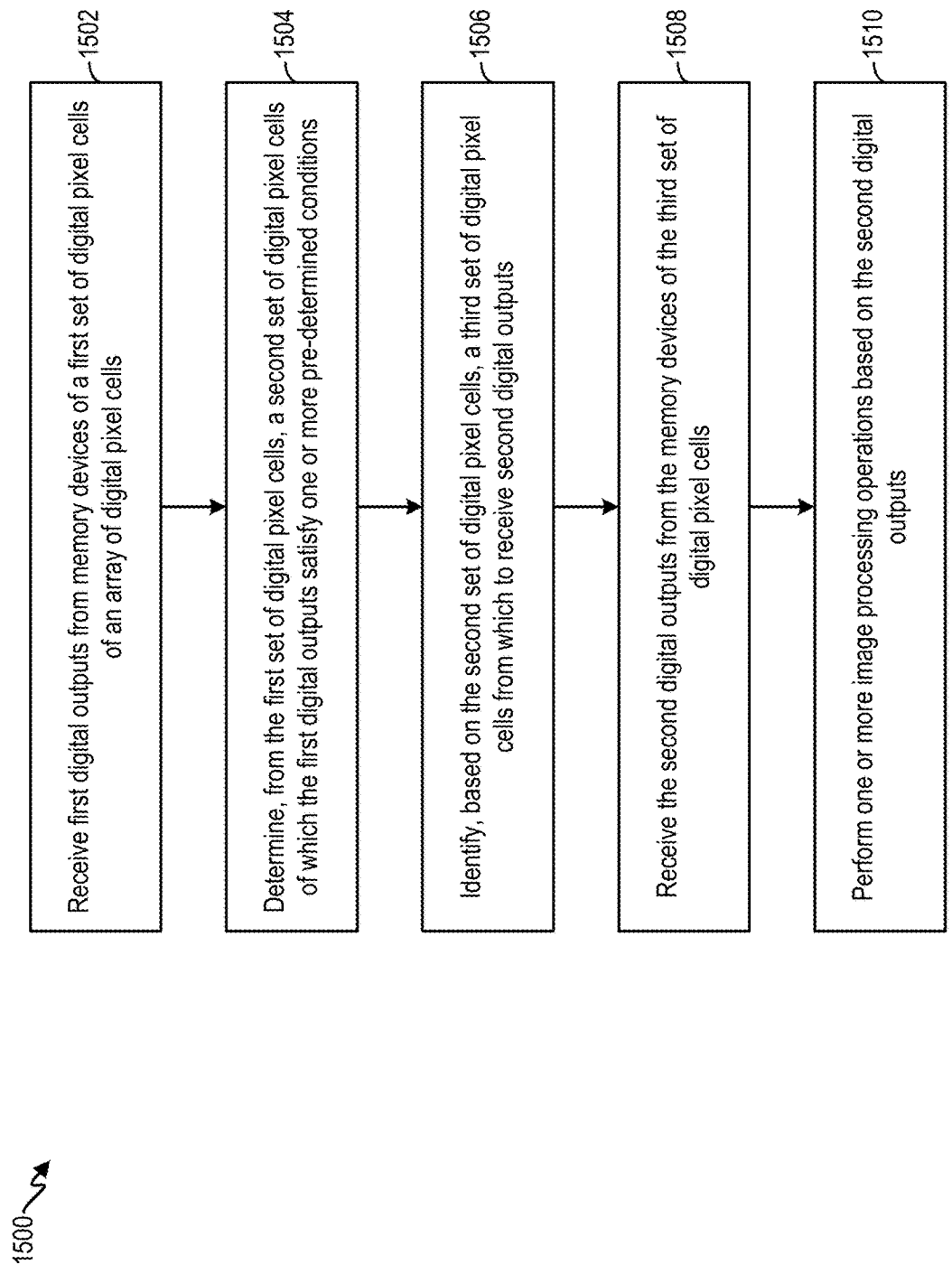

DIGITAL PIXEL ARRAY WITH MULTI-STAGE READOUTS

CROSS-REFERENCE TO RELATED APPLICATIONS

This application is a continuation of U.S. Non-Provisional application Ser. No. 16/255,528, filed Jan. 23, 2019, entitled "DIGITAL PIXEL ARRAY WITH MULTI-STAGE READOUTS" which claims the benefit of U.S. Provisional Application No. 62/621,336, filed Jan. 24, 2018, entitled "Digital Pixel Array with Multi-Stage Readouts" which are incorporated herein by reference in their entirety.

BACKGROUND

The disclosure relates generally to image sensors, and more specifically to pixel cell structure including interfacing circuitries for determining light intensity for image generation.

A typical image sensor includes a photodiode to sense incident light by converting photons into charge (e.g., electrons or holes). The image sensor further includes a floating node configured as a capacitor to collect the charge generated by the photodiode during an exposure period. The collected charge can develop a voltage at the capacitor. The voltage can be buffered and fed to an analog-to-digital converter (ADC), which can convert the voltage into a digital value representing the intensity of the incident light.

SUMMARY

The present disclosure relates to image sensors. More specifically, and without limitation, this disclosure relates to a pixel cell array that supports multi-stage readouts in an exposure period to generate an image frame.

In one example, an apparatus is provided. The apparatus may include an array of digital pixel cells, each digital pixel cell including a photodiode and a memory device configured to store a digital output generated based on a quantity of charge generated by the photodiode in an exposure period. The apparatus may also include an image processor configured to: receive first digital outputs from the memory devices of a first set of digital pixel cells of the array of digital pixel cells; determine, from the first set of digital pixel cells, a second set of digital pixel cells of which the first digital outputs satisfy one or more pre-determined conditions; identify, based on the second set of digital pixel cells, a third set of digital pixel cells from which to receive second digital outputs generated based on a quantity of charge generated by the photodiodes of the third set of digital pixel cells in the exposure period, the third set of digital pixel cells being part of the array of digital pixel cells; receive the second digital outputs generated by the third set of digital pixel cells; and perform one or more image processing operations based on at least the second digital outputs.

In some aspects, each digital pixel cell includes one or more comparators configured to generate a first comparator output indicating whether an intensity of light received by the photodiode of the each digital pixel cell within the exposure period exceeds a first threshold. The first digital outputs may include the first comparator outputs from the first set of digital pixel cells.

In some aspects, the one or more comparators are further configured to generate a second comparator output indicating whether the intensity of light received by the photodiode of the each digital pixel cell within the exposure period is below a second threshold. The first digital output may include at least one of the first comparator outputs or the second comparator outputs from the first set of digital pixel cells.

In some aspects, the memory device of each digital pixel cell is configured to store a quantization value representing an intensity of light received by the photodiode of each digital pixel cell within the exposure period, the quantization value comprising a number of bits. The first digital outputs may include a subset of bits of the quantization values stored at the memory devices of the first set of digital pixel cells. The second digital outputs may include the quantization values stored at the memory devices of the third set of digital pixel cells.

In some aspects, the first set of digital pixel cells comprise each digital pixel cell of the array of digital pixel cells.

In some aspects, the first set of digital pixel cells may comprise a smaller set of digital pixel cells than a total number of the digital pixel cell of the array of digital pixel cells.

In some aspects, the third set of digital pixel cells may include the second set of digital pixel cells.

In some aspects, each digital pixel cell may include a capacitor to accumulate the charge generated by the photodiode during the exposure period, and a counter configured to, in a first measurement mode, generate a first counter output representing a measurement of a time for a quantity of the charge accumulated at the capacitor to reach a pre-determined threshold. The first set of digital pixel cells may be configured to generate the first digital outputs based on the first counter outputs.

In some aspects, the counter is also configured to, in a second measurement mode, generate a second counter output representing a measurement of the quantity of the charge accumulated at the capacitor when the exposure period ends. The third set of digital pixel cells may be configured to generate the second digital outputs based on the first counter outputs or the second counter outputs.

In some aspects, the capacitor has a configurable capacitance. The capacitor may be configured to have a higher capacitance in the first measurement mode than in the second measurement mode.

In some aspects, the one or more pre-determined conditions may include: the first digital output indicating an intensity of light received by the photodiode of a digital pixel cell of the first set of digital pixel cells within the exposure period exceeds a pre-determined threshold.

In some aspects, the pre-determined threshold is based on an intensity of light associated with a glint of an eyeball. In some aspects, the pre-determined threshold is based on an intensity of infra-red light reflected by a physical object when illuminated by an infra-red illuminator.

In some aspects, the one or more pre-determined conditions comprise: the first digital outputs matching a light intensity distribution pattern associated with a pre-determined image feature.

In some aspects, the second digital outputs can be received from the memory devices of the third set of digital pixel cells. In some aspects, the second digital outputs can be received from a framebuffer.

In some aspects, the image processor is further configured to identify, based on the second set of digital pixel cells, a fourth set of digital pixel cells from which to receive third digital outputs, the fourth set of digital pixel cells being part of the array of digital pixel cells and being different from the third set of digital pixel cells. The image processor may receive the third digital outputs generated by the fourth set of digital pixel cells, and the one or more image processing operations can be performed based on the third digital outputs.

In some aspects, the second digital outputs and the third digital outputs may have different bit-depths. In some aspects, the third digital outputs may comprise comparator outputs indicating whether an intensity of light received by the photodiodes of the fourth set of digital pixel cells within the exposure period exceeds a threshold, whereas the second digital outputs may represent quantization results of an intensity of light received by the photodiodes of the third set of digital pixel cells within the exposure period.

In another example, a method is provided. The method comprises receiving first digital outputs from memory devices of a first set of digital pixel cells of an array of digital pixel cells, the first digital outputs being generated based on a quantity of charge generated by a photodiode of each of the first set of digital pixel cells in an exposure period; determining, from the first set of digital pixel cells, a second set of digital pixel cells of which the first digital outputs satisfy one or more pre-determined conditions; identifying, based on the second set of digital pixel cells, a third set of digital pixel cells from which to receive second digital outputs, the third set of digital pixel cells being part of the array of digital pixel cells, and the second digital outputs being generated based on a quantity of charge generated by a photodiode of each of the third set of digital pixel cells in the exposure period; receiving the second digital outputs from the memory devices of the third set of digital pixel cells; and performing one or more image processing operations based on the second digital outputs.

In some aspects, at least some of the first digital outputs represents a measurement of a time for a quantity of the charge accumulated at a capacitor of each of the first set of digital pixel cells to reach a pre-determined threshold.

In some aspects, the pre-determined threshold is based on an intensity of light associated with a glint of an eyeball.

In some aspects, the pre-determined threshold is based on an intensity of infra-red light reflected by a physical object when illuminated by an infra-red illuminator.

In some aspects, at least some of the second digital outputs represents one of: a measurement of a quantity of the charge accumulated at a capacitor of the third set of digital pixel cells when the exposure period ends, or a measurement of a time for the quantity of the charge accumulated at the capacitor to exceed a saturation threshold.

In some aspects, the one or more pre-determined conditions comprise: the first digital outputs matching a light intensity distribution pattern associated with a pre-determined image feature.

In some aspects, the third set of digital pixel cells is determined based on identifying, from the array of digital pixel cells, digital pixel cells that are at a pre-determined distance from the second set of digital pixel cells.

In some aspects, the third set of digital pixel cells is determined based on identifying a region of digital pixel cells of a pre-determined shape that encircles the second set of digital pixel cells.

BRIEF DESCRIPTION OF THE DRAWINGS

Illustrative embodiments are described with reference to the following figures.

FIG. 15 illustrates an embodiment of a flowchart of a process for determining a light intensity.

Figure 1A:
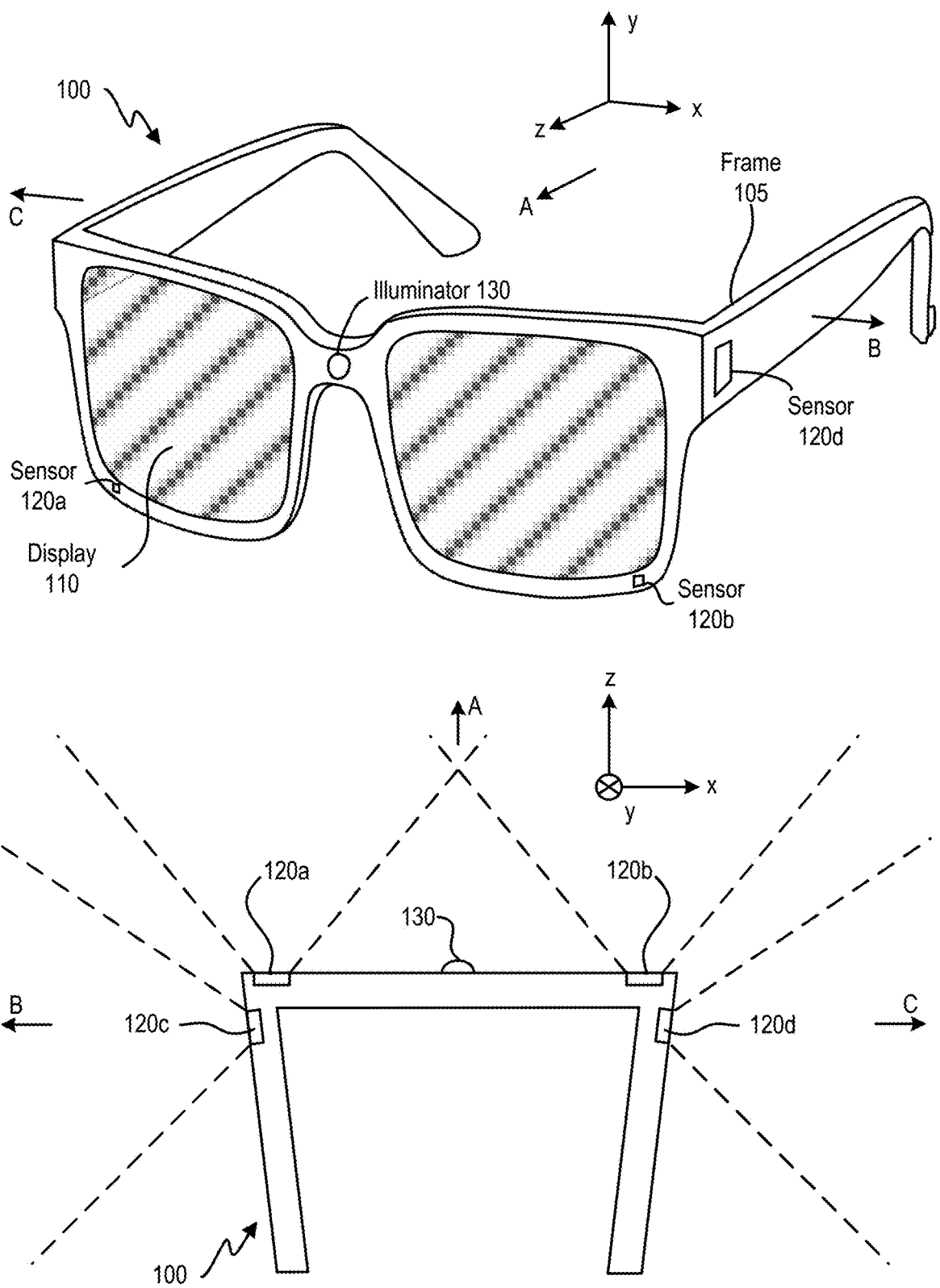
FIGS. 1A and 1B are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes a photodiode to sense incident light by converting photons into charge (e.g., electrons or holes). The image sensor further includes a floating node configured as a capacitor to collect the charge generated by the photodiode during an exposure period. The collected charge can develop a voltage at the capacitor. The voltage can be buffered and fed to an analog-to-digital converter (ADC), which can convert the voltage into digital pixel data representing the intensity of the incident light. Each of the digital values has a bit depth (e.g., 8 bits, 16 bits, etc.) determined based on the quantization resolution of the ADC.

An image can be generated based on intensity data provided by an array of image sensors, with each image sensor forming a pixel cell that corresponds to a pixel of the image. The array of pixel cells can be arranged into rows and columns, with each pixel cell generating a voltage representing the intensity for a pixel associated with a particular location in the image. A number of pixels included in the array can determine a resolution of the generated image. An image can be reconstructed based on the digital intensity data of each pixel generated by the ADC. The digital intensity data of each pixel of an image frame can be stored in a frame buffer for subsequent processing.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system. A location tracking system can obtain the digital intensity data of an image frame from the frame buffer and search for patterns of intensity data representing certain image features to identify one or more physical objects in the image. The image locations of the physical objects can be tracked to determine the locations of the physical objects in the environment (e.g., through triangulation). The location information of the physical objects can be provided to a simultaneous localization and mapping (SLAM) algorithm to determine, for example, a location of the user, an orientation of the user, and/or a path of movement of the user in the physical environment. The image data can also be used to, for example, generate stereo depth information for measuring a distance between the user and the physical object in the physical environment, to track a movement of the physical object (e.g., user's eyeballs), etc. In all these examples, the VR/AR/MR system can generate and/or update virtual image data based on the information (e.g., a location of a user, a gaze point direction, etc.) obtained from the physical image data, and provide the virtual image data for displaying to the user via the near-eye display to provide an interactive experience.

To identify an object from an image frame, the location tracking system may obtain and process pixel data of full bit-depth for each and every pixel of an image frame. Such an approach requires processing a large volume of pixel data and is both power-intensive and bandwidth-intensive. Such an approach may not be suitable for a wearable/mobile VR/AR/MR system which may provide limited power and computation bandwidth. To reduce power as well as computation bandwidth usage, the location tracking system can process each pixel of a first image frame to identify a region of interest (ROI) corresponding to an identified object. The location tracking system can then search the ROI in the subsequent image frames for pixels of the identified object. Although such an approach can reduce the volume of pixel data to be processed for the subsequent image frames, additional processing may be needed to account for ROI shifts due to movements of the object, which can increase computation complexity and reduce the accuracy of object identification.

This disclosure relates to an image sensor. The image sensor may include an array of digital pixel cells and an image processor. Each digital pixel cell includes a photodiode to receive light in an exposure period, and a memory device configured to store a digital output based on an intensity of light received by the photodiode. The image sensor further comprises an image processor. The image processor may perform a multi-stage read-out of the array of digital pixel cells. For example, in a first stage read-out, the image processor may receive first digital outputs from the memory devices of a first set of digital pixel sensors of the array of digital pixel cells. The first digital outputs may be based on an intensity of light received by each photodiode of the first set of digital pixel cells in an exposure period. The image processor may determine, from the first set of digital pixel cells, a second set of digital pixel cells of which the first digital outputs satisfy one or more pre-determined conditions. Based on the second set of digital pixel cells, the image processor may determine a third set of digital pixel cells corresponding to pixels of a region of interest for the second stage read-out. The image processor may receive second digital outputs from the memory devices of the third set of digital pixel cells. The second digital outputs may be based on an intensity of light received by each photodiode of the second set of digital pixel cells in the exposure period. The image processor may also perform additional stages of read-out to determine additional sets of digital pixel cells from which the image processor can receive additional digital outputs. The image processor may perform one or more image processing operations based on the second digital outputs (and the additional digital outputs). The total data size of the first digital outputs can be smaller than the total data size of the second digital outputs due to, for example, the first set of digital pixel cells including a smaller set of digital pixel cells than the second set of digital pixel cells, the first digital outputs having lower quantization resolutions (e.g., of smaller bit depth) than the second digital outputs, etc.

The disclosed techniques can potentially reduce a number of pixels to be processed for object identification, which can reduce the power and computation bandwidth usage. For example, the image processor can determine one or more ROIs based on the first digital outputs in the first stage read-out, and perform subsequent stages of read-out based on the ROIs to narrow the search for the pixels of the object instead of processing each and every pixel of an image. As a result, the computations involved in the object identification can be greatly reduced. On the other hand, the multi-stage read-outs occur within the same exposure period and for the same image frame. Therefore, the problem of ROI shift for an moving object can be avoided, and uniform processing can be performed for object identification regardless of whether the object is moving or is static. All these allow a more robust and efficient object identification processing to be implemented on a wearable/mobile VR/AR/MR system where available power and computation bandwidth are typically limited.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two field of views towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such arrangement, the accuracy and robustness of tracking a location of the user within the physical environment can be improved.

In some embodiments, near-eye display 100 may further include one or more active illuminator 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
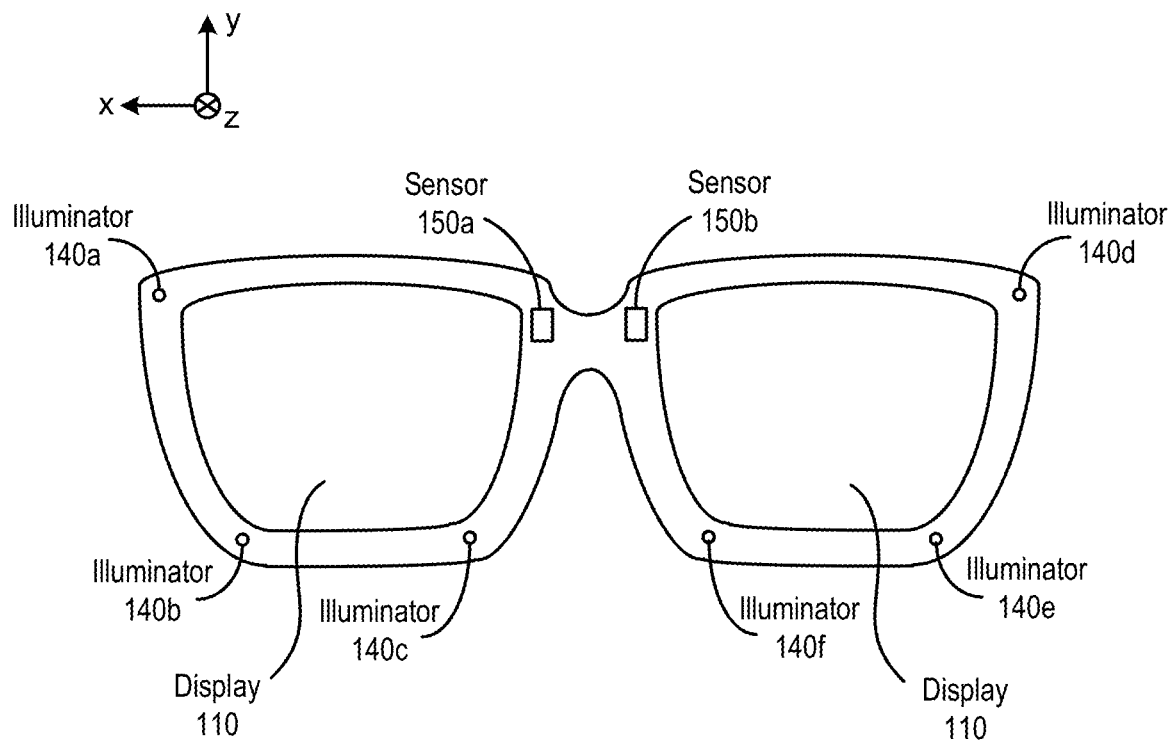
Figure 1B:
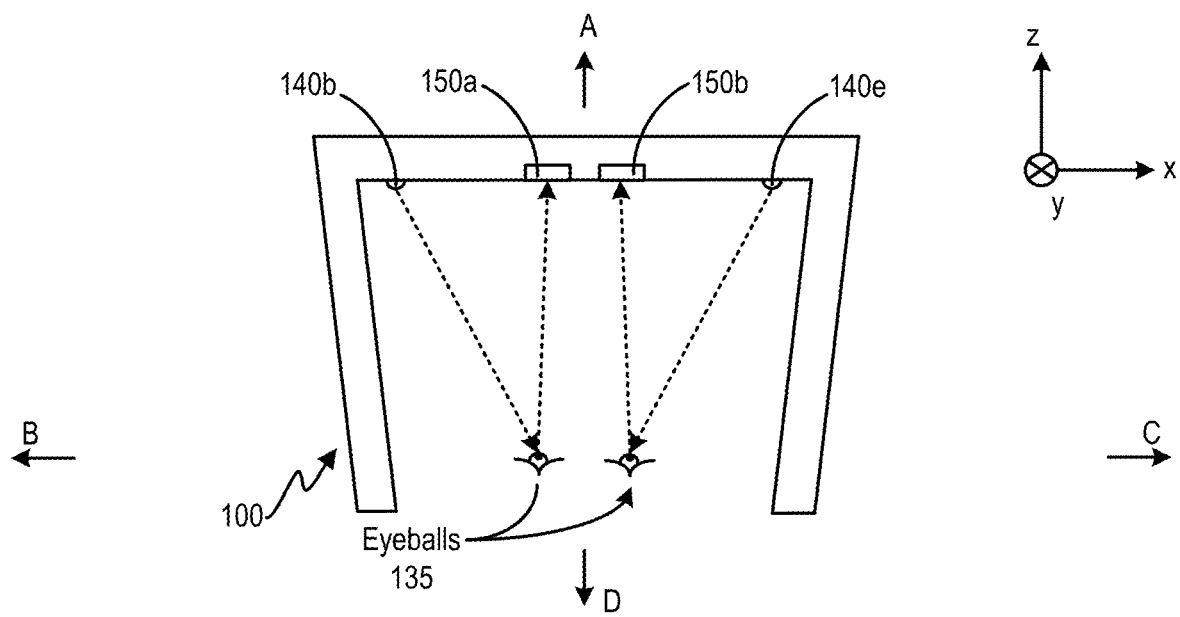

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140*d*, 140*e*, and 140*f* may emit NIR lights carrying the pattern. The NIR lights can be reflected by the right eyeball of the user, and may be received by sensor 150*b*. Sensor 150*b* may also include a pixel array to generate an image of the reflected pattern. Based on the images of the reflected pattern from sensors 150*a* and 150*b*, the system can determine a gaze point of the user, and update the image data provided to display 100 based on the determined gaze point to provide an interactive experience to the user.

As discussed above, to avoid damaging the eyeballs of the user, illuminators 140*a*, 140*b*, 140*c*, 140*d*, 140*e*, and 140*f* are typically configured to output lights of very low intensities. In a case where image sensors 150*a* and 150*b* comprise the same sensor devices as image sensors 120*a*-120*d* of FIG. 1A, the image sensors 120*a*-120*d* may need to be able to generate an output that correlates with the intensity of incident light when the intensity of the incident light is very low, which may further increase the dynamic range requirement of the image sensors.

Moreover, the image sensors 120*a*-120*d* may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120*a*-120*d* need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 2:
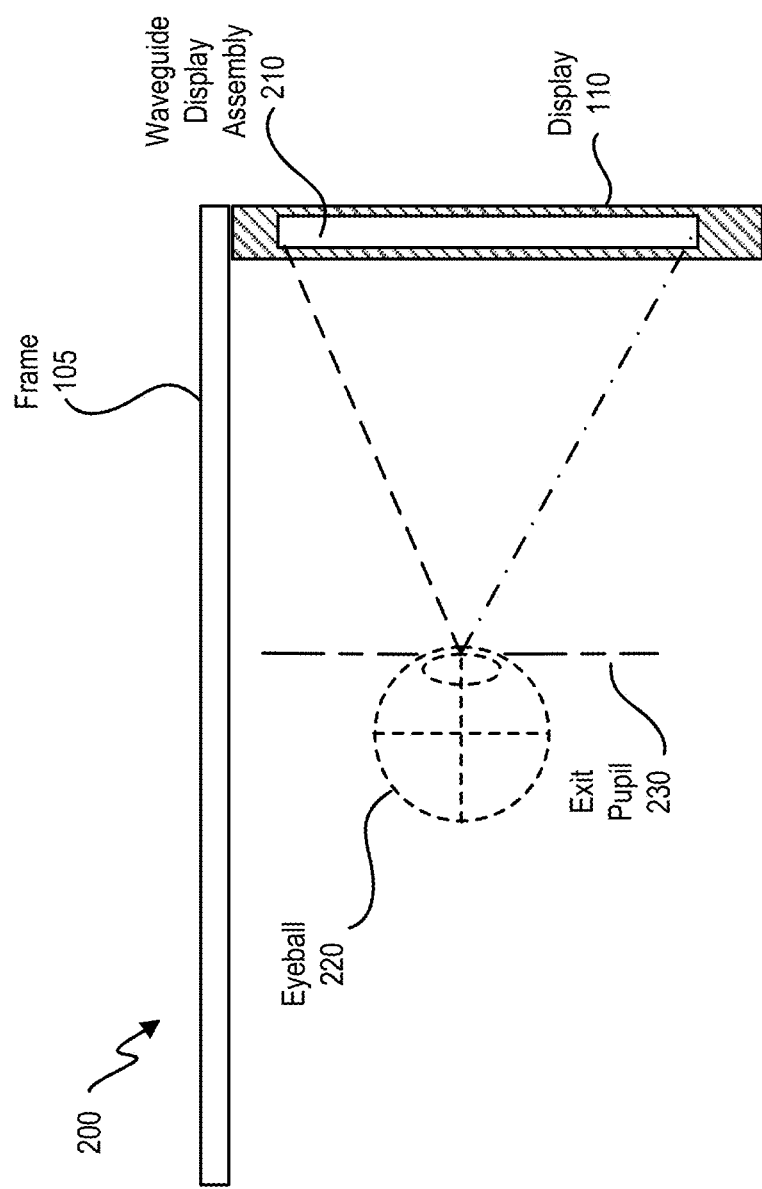
FIG. 2 is an embodiment of a cross section of the near-eye display.

FIG. 2 is an embodiment of a cross section 200 of near-eye display 100 illustrated in FIG. 1A and FIG. 1B. Display 110 includes at least one waveguide display assembly 210. An exit pupil 230 is a location where a single eye 220 of the user is positioned in an eyebox region when the user wears the near-eye display 100. For purposes of illustration, FIG. 2 shows the cross section 200 with eye 220 and a single waveguide display assembly 210, but a second waveguide display is used for a second eye of a user.

Waveguide display assembly 210 is configured to direct image light to an eyebox located at exit pupil 230 and to eye 220. Waveguide display assembly 210 may be composed of one or more materials (e.g., plastic, glass, etc.) with one or more refractive indices. In some embodiments, near-eye display 100 includes one or more optical elements between waveguide display assembly 210 and eye 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
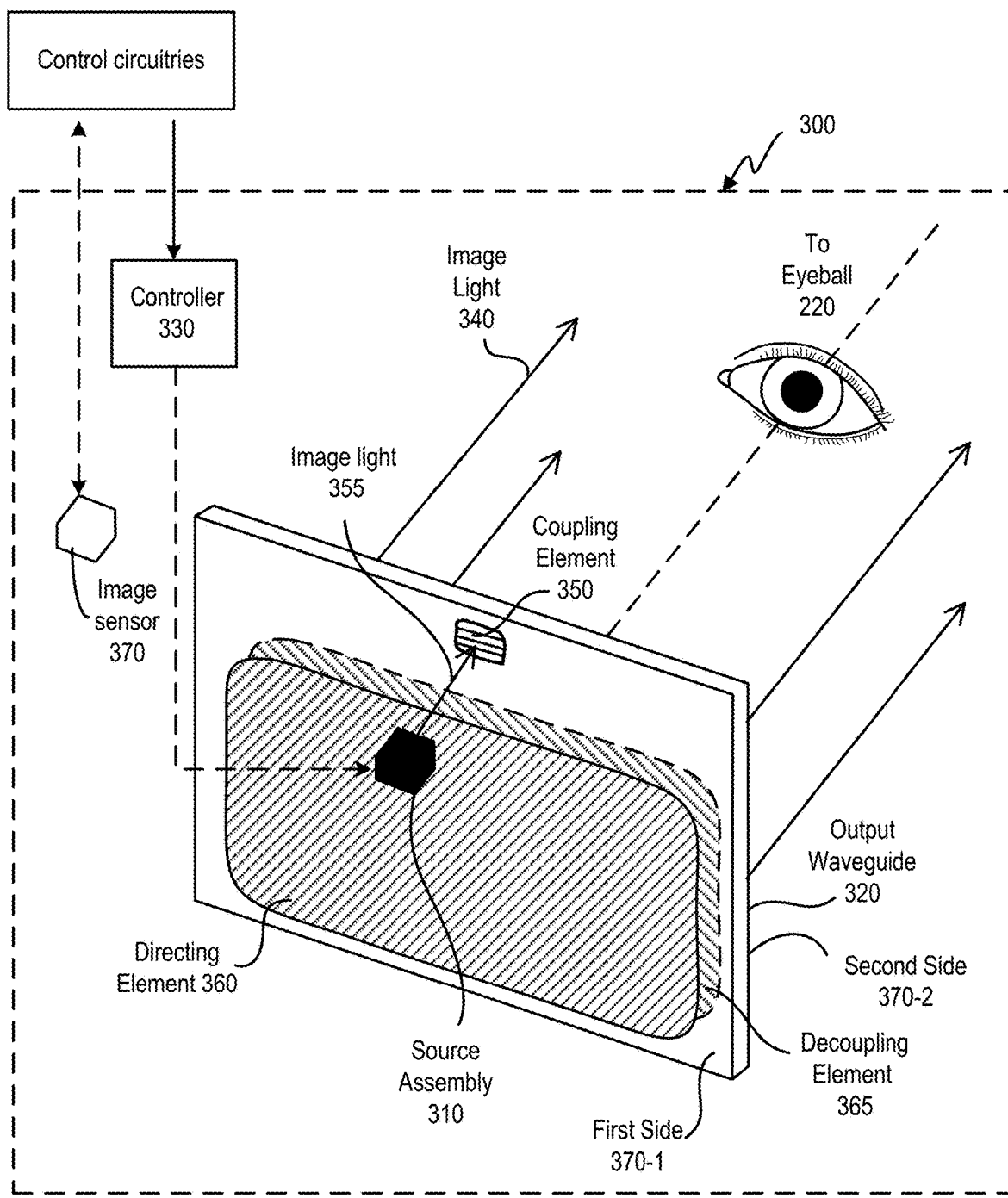
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eye 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eye 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eye 220 with a large field of view (FOV). For example, the expanded image light 340 is provided to the user's eye 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eye 220 (e.g., for gaze point determination) of the user. Image sensor 370 may interface with control circuitries that are not located within waveguide display 300 (e.g., in a remote console). Image sensor 370 may provide image data to the control circuitries, which may determine, for example, a location of the user, a gaze point of the user, etc., and determine the content of the images to be displayed to the user. The control circuitries can transmit instructions to controller 330 related to the determined content. Based on the instructions, controller 330 can control the generation and outputting of image light 355 by source assembly 310.

Figure 4:
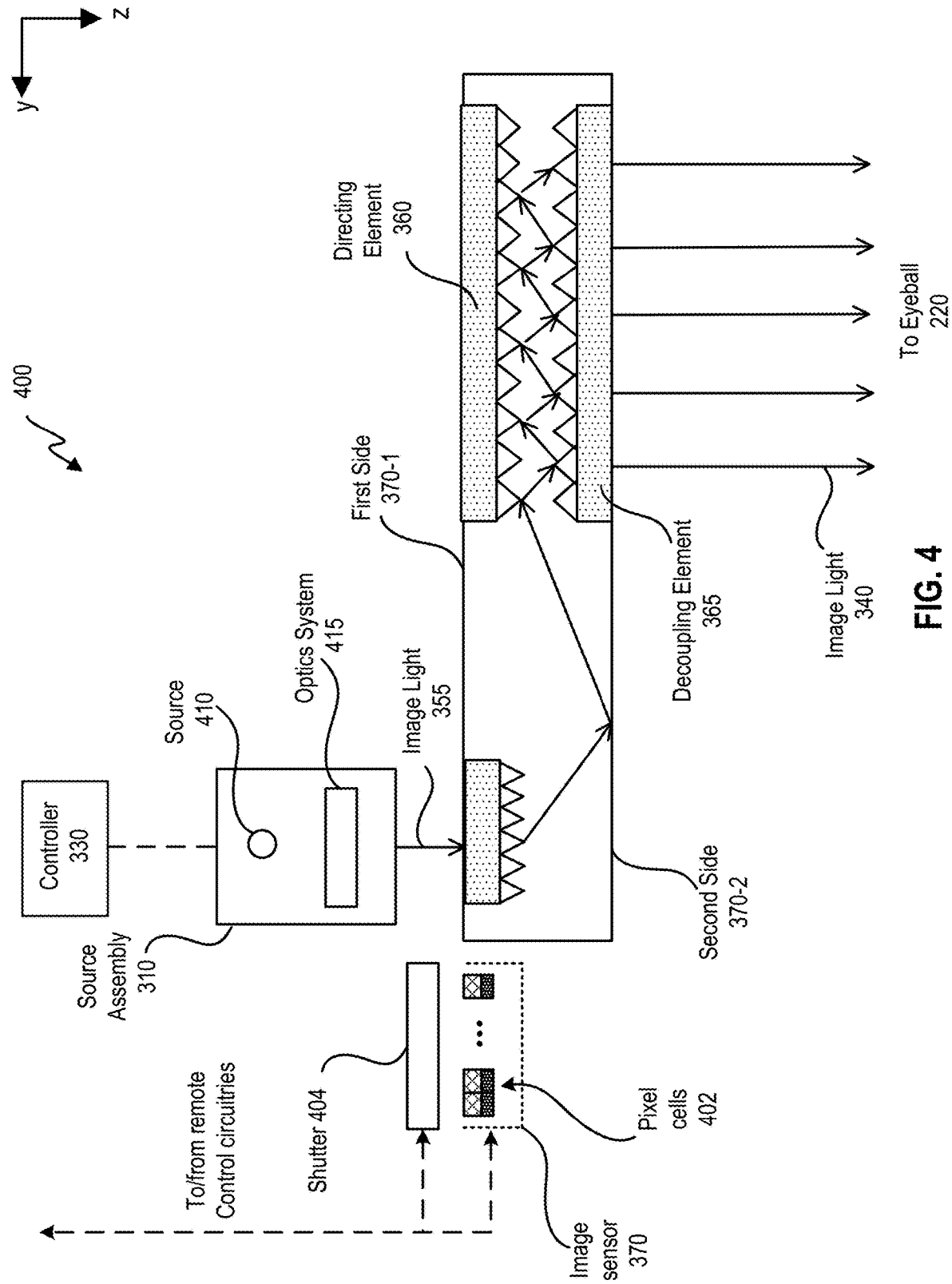
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the control circuitries, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
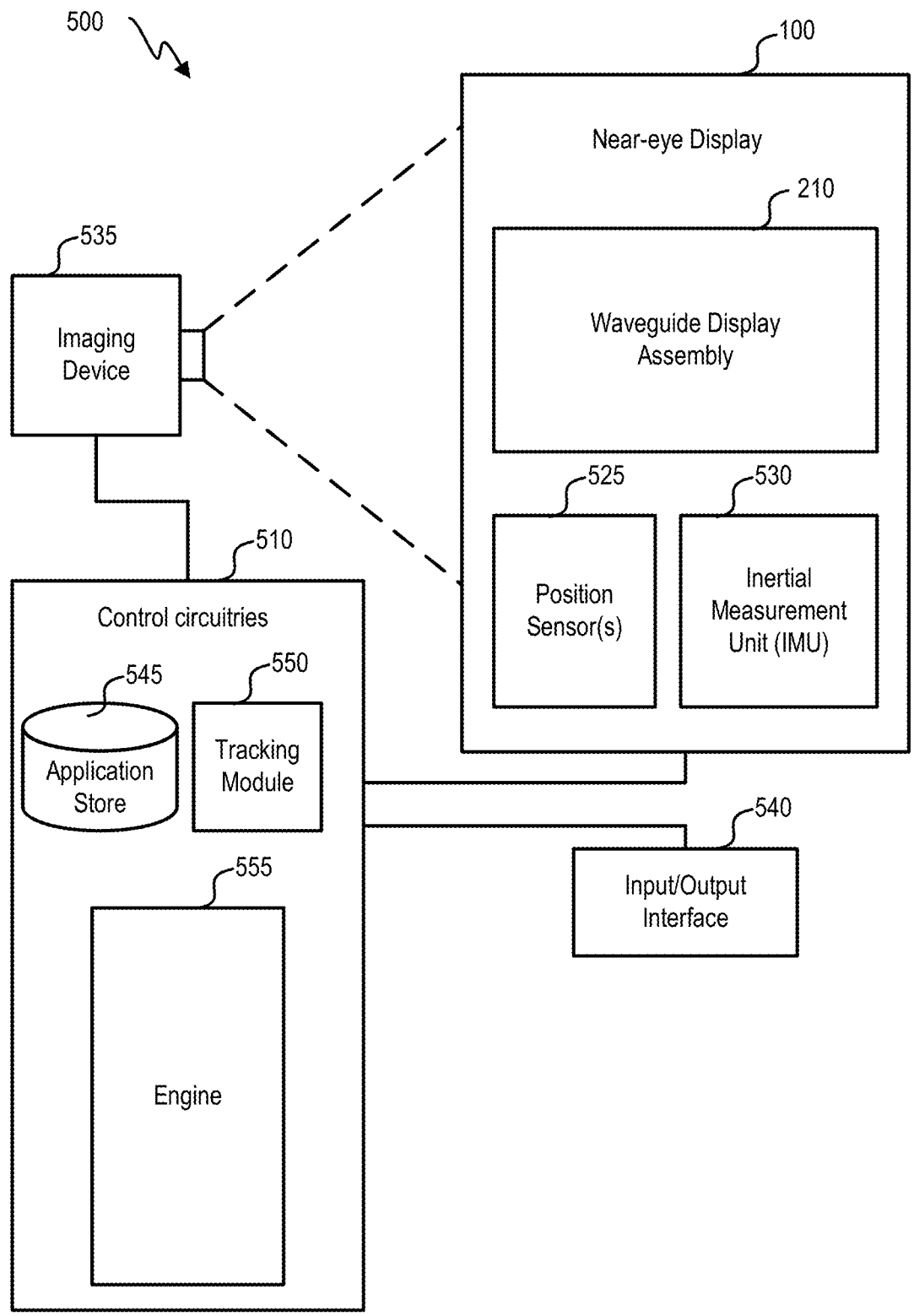
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, for identifying an object of interest of the user, etc.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 tracks movements of near-eye display 100 using, for example, image date from the imaging device 535. As to be discussed in more detail below, tracking module 550 may obtain pixel data of an image frame captured by imaging device 535 and identify one or more objects in the image frame based on the pixel data, determine the image locations of the one or more objects across multiple image frames, and determine the physical locations of the one or more objects based on the image locations. In some examples, the physical locations information can be provided to a SLAM algorithm operated in tracking module 550 to generate position information of near-eye display 100. In some examples, the image locations information can be used to generate position information of the identified object.

Engine 555 executes applications within system 500 and receives position information, acceleration information, velocity information, and/or predicted future positions of near-eye display 100 from tracking module 550. Engine 555 can also receive position information of a physical object (other than near-eye display 100) from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535).

Figure 6A:
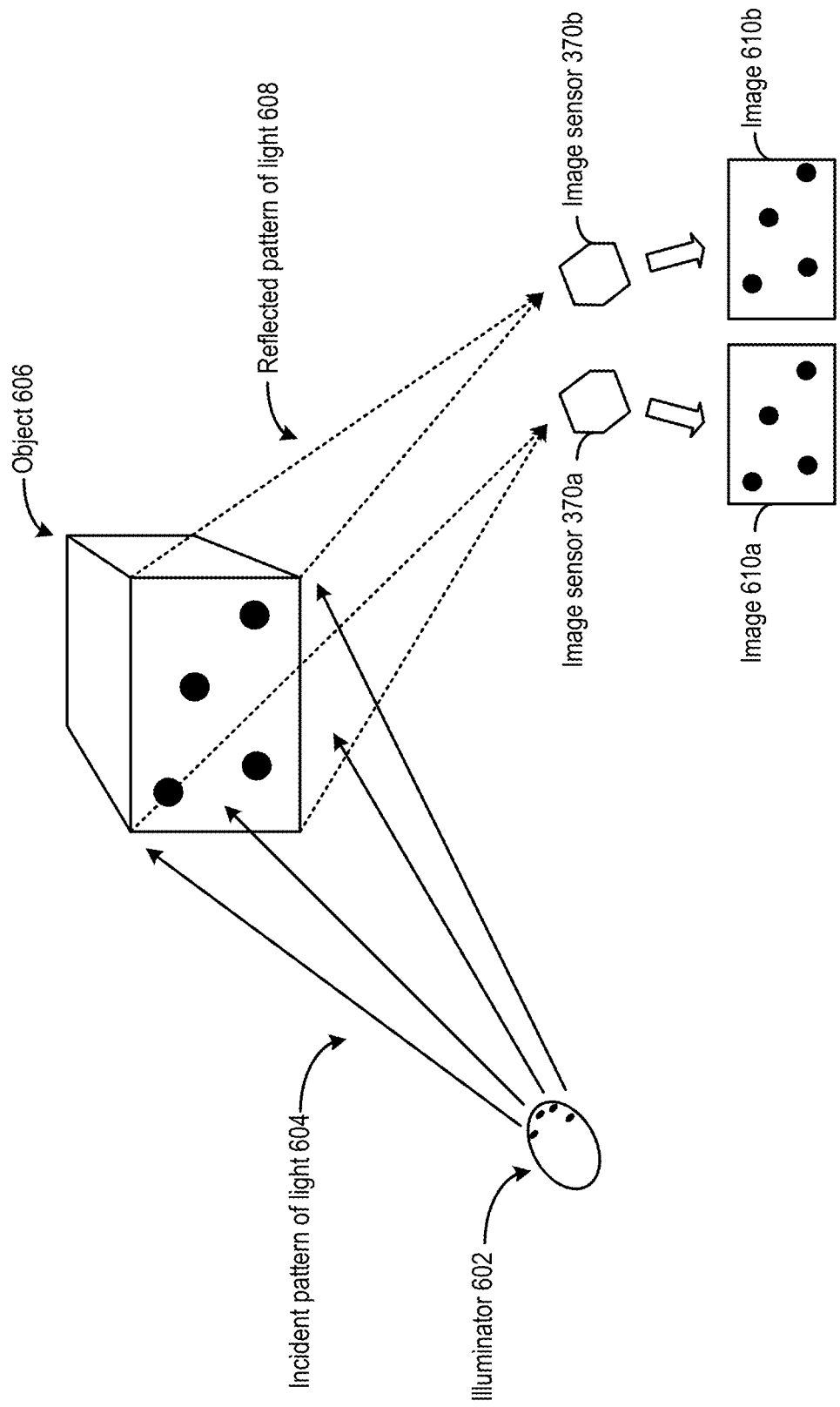
FIGS. 6A, 6B, and 6C illustrate examples of object identification and tracking operations which can be performed by near-eye display of FIG. 5.
Figure 6B:
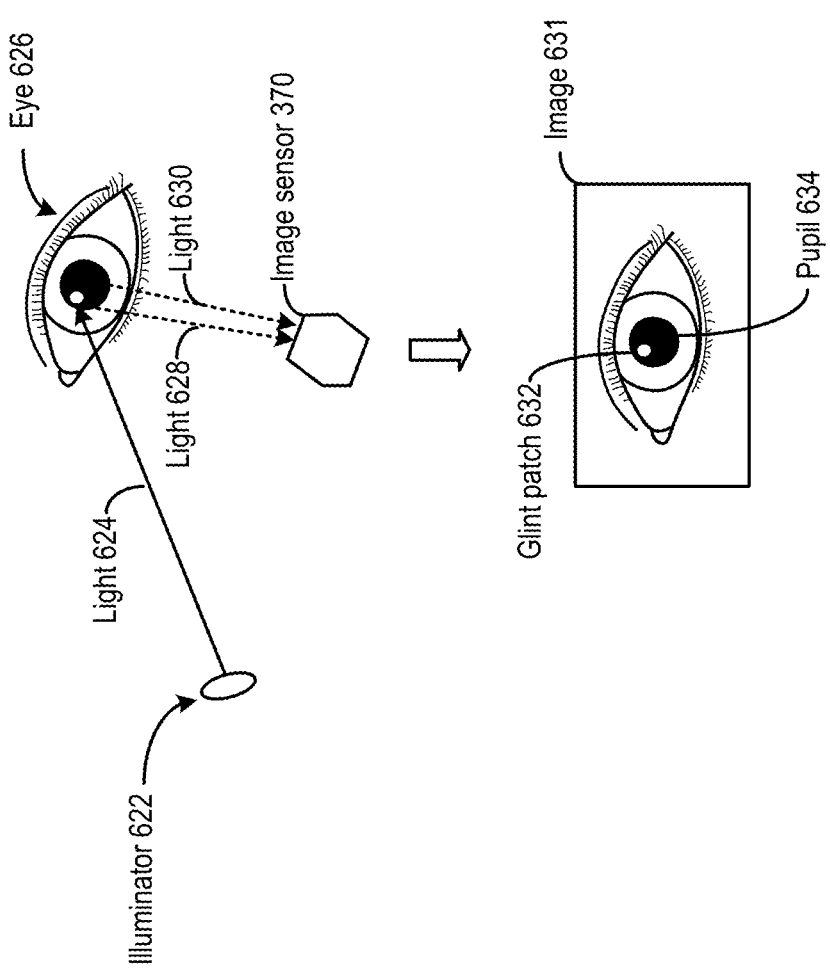
Figure 6C:
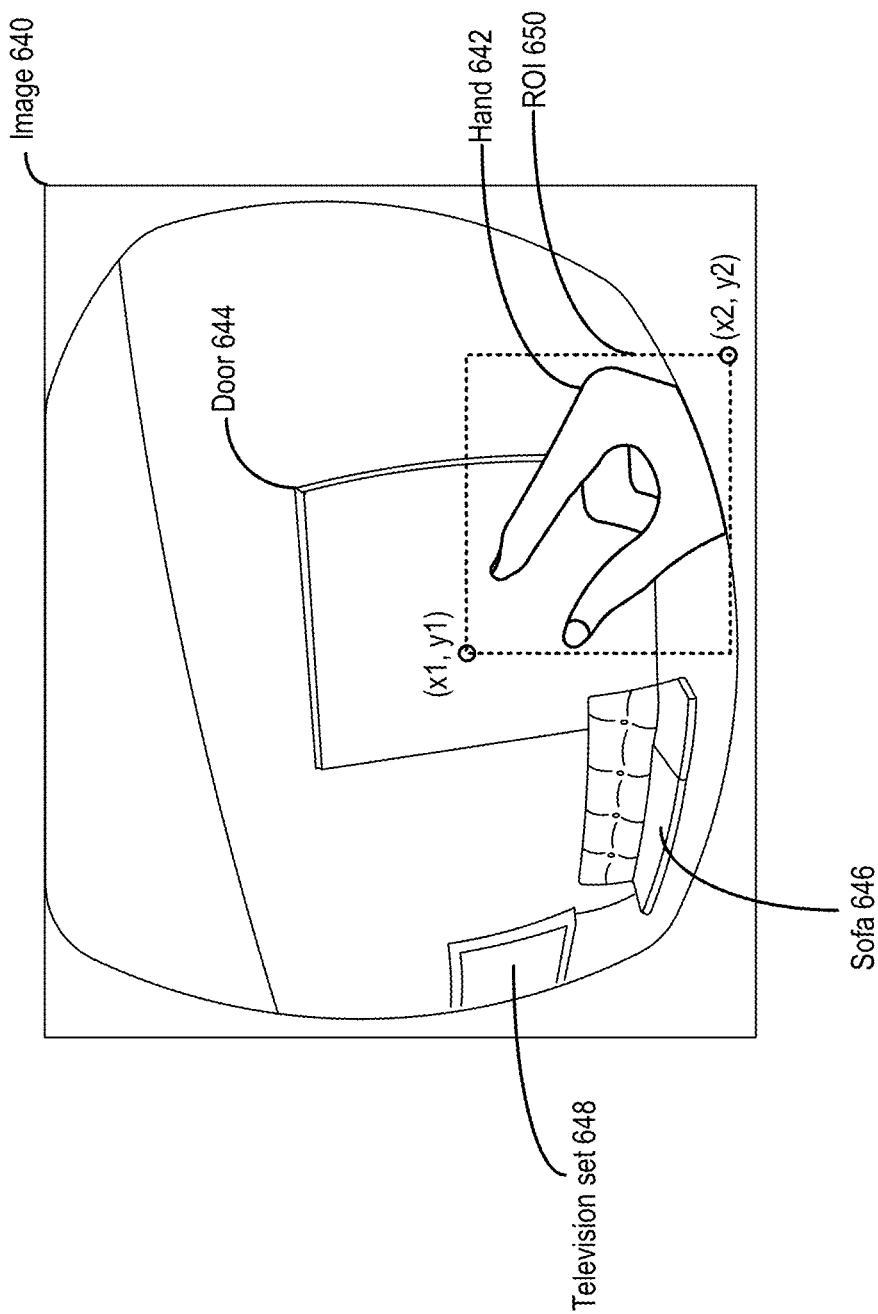

FIGS. 6A-6C illustrate examples of image-based object identification and tracking operations which can be performed by tracking module 550. FIG. 6A illustrates an example of determining a distance between an object and a user based on image data provided by imaging device 535. In the example of FIG. 6A, an illuminator 602 (e.g., of infra-red light) can project a pre-determined pattern of light 604 (e.g., dots, or patterns of other shapes) onto an object 606. Incident pattern of light 604 can reflect off the surfaces of object 606 to become reflected pattern of light 608. Each of image sensors 370a and 370b of near-eye display 100 includes an array of pixel cells 402 and can capture reflected pattern of light 608 to generate, respectively, an image 610a and an image 610b of the reflected pattern. Image sensors 370a and 370b are positioned at different locations of near-eye display 100 and have different viewing angles with respect to object 606. As a result, the image locations of the reflected pattern may shift between images 610a and 610b. To determine a distance between object 606 and image sensors 370a and 370b, tracking module 550 can determine a difference in the image locations of reflected pattern of light 608 between images 610a and 610b. Based on the difference in the image locations, as well as a distance between image sensors 370a and 370b, tracking module 550 can apply triangulation to estimate the distance between object 606 and image sensors 370a and 370b (and near-eye display 100). The distance information can be provided to an SLAM algorithm to track a location of the user wearing near-eye display 100 within a physical environment.

To determine the difference in the image locations of reflected pattern of light 608 between images 610a and 610b, tracking module 550 may include an image processor configured to identify pattern of light 608 (e.g., by identifying the dots) from the pixel data of images 610a and 610b, and to determine the image locations of the identified pattern in both images. As to be discussed in more detail below, image sensors 370a and 370b can provide information that can be used to estimate the image locations of each dot (in respectively images 610a and 610b) to the image processor. The information can be performed in a first stage read-out of the outputs of the pixel cells in image sensors 370a and 370b. In some examples, the information may include a set of pixel cells (of image sensor 370a and 370b) each of which receives light of an intensity that exceeds a pre-determined threshold, which may indicate that those pixel cells receive light corresponding to the dots. In some examples, the information may also include a portion of digital data (e.g., the most significant bits (MSBs)) representing the intensity of light received at each pixel cell of image sensor 370a and 370b. Based on the MSBs of the digital data, the image processor can also perform a second stage (or multi-stage) read-out of the outputs of the pixel cells in image sensors 370a and 370b to identify pixel cells that are likely to receive light corresponding to the dots.

In some examples, the information can also include full bit-depth pixel data from a pre-determined set of pixel cells of image sensor 370a and 370b. The pre-determined set of pixel cells may be configured to obtain spatial sub-samples of pattern of light 608. For example, the pixel cell array can be divided into a grid of pixel cell blocks, and one pixel cell can be selected from each pixel cell blocks to provide full bit-depth pixel data as spatial sub-samples of pattern of light 608. Based on the sub-samples, the image processor can also identify pixel cells (of the pre-determined set of pixel cells) that are likely to receive light corresponding to the dots.

Based on the information, the image processor can estimate the image locations of each dot in respectively images 610a and 610b and the corresponding pixel cells of image sensor 370a and 370b. The image processor can also identify regions of interests (ROIs) corresponding to the dots (e.g., by identifying a circular region, a rectangular region, or a region of other shapes surrounding each of the estimated locations), and the pixel locations within the regions of interests. The image processor can then obtain, in a second read-out, the pixel data corresponding to the pixel locations either directly from the pixel cells of image sensors 370a and 370b or from a frame buffer, and perform processing to identify the dots and their locations in images 610a and 610b. In some examples, additional read-out stages may be included where each read-out can have different sets of pixels and/or produce pixel data of different bit-depths, and the pixel data of the additional read-out stages may be provided to the image processor to identify the dots and their locations in images 610a and 610b. With such an arrangement, the image processor needs not process the full bit-depth pixel data of each and every pixel of images 610a and 610b to identify pattern of light 608, which can reduce power and bandwidth usage and improve the efficiency of the object distance measurement processes. Moreover, since the system needs not process the full frame pixel data, the system latency can be reduced.

FIG. 6B illustrates an example of determining a gaze point of a user based on image data provided by imaging device 535. In the example of FIG. 6B, an illuminator 622 (e.g., of near infra-red light) can project light 624 onto eye 626. Light 628 and light 630 can be reflected off different parts of eye 626. For example, light 628 may be reflected off the cornea surface (not shown in FIG. 6B) of eye 626, whereas light 630 may be reflected off pupil 634 of eye 626. The array of pixel cells 402 of image sensor 370 (of near-eye display 100) can capture light 628 and light 630 to generate an image 631 of eye 626. Image 631 may include a glint patch 632 (represented as a white patch in pupil 634 in FIG. 6B) generated from light 628, as well as an image of pupil 634 generated from light 630. A gaze direction of the user can be determined based on the image locations of glint patch 632 and pupil 634 within image 631.

To determine the image locations of glint patch 632 and pupil 634 within image 631, the image processor can identify pixel data corresponding to glint patch 632 and pupil 634 in image 631, and determine the locations of the identified pixel data in the image. The identification can be based on, for example, determining whether the intensity of the received light exceeds a high threshold associated with a glint patch or is below a low threshold associated with a pupil image. As to be discussed in more detail below, image sensor 370 can provide information indicating a set of pixel cells (of image sensor 370) each of which receives light of an intensity that exceeds a pre-determined threshold, which may indicate that those pixel cells receive light corresponding to glint patch 632. Based on the locations of those pixel cells, the image processor can identify a first ROI corresponding to glint patch 632 and a second ROI surrounding glint patch 632 and corresponding to pupil 634. In some examples, the second ROI may also be at a pre-determined distance from glint patch 632 (or first ROI) and encircling part of pupil 634, such that the second ROI does not include glint patch 632. The image processor can determine the pixel locations within the first and second ROIs, obtain the pixel data corresponding to the pixel locations (either directly from the pixel cells of image sensors 370a and 370b or from a frame buffer), and perform processing to identify glint patch 632 and pupil 634. In some examples, additional read-out stages may be included where each read-out can have different sets of pixels and/or produce pixel data of different bit-depths, and the pixel data of the additional read-out stages may be provided to the image processor to identify glint patch 632 and pupil 634 and their locations in image 631. With such arrangement, the image processor needs not process the full bit-depth pixel data of each and every pixel of images 631 to identify glint patch 632 and pupil 634, which can reduce power and bandwidth usage and improve the efficiency of the gaze tracking process. Moreover, since the system needs not process the full frame pixel data, the system latency can be reduced as well.

FIG. 6C illustrates an example of identifying an object based on image data provided by imaging device 535. In the example of FIG. 6C, an image 640 including a hand 642 (of the user), a door 644, a sofa 646, and a television set 648 can be captured by the array of pixel cells 402 of image sensor 370 (of near-eye display 100). Tracking module 550 may identify hand 642 from image 640 and track a movement of hand 642 to identify, for example, a hand gesture by the user. Tracking module 550 can provide the hand gesture information to engine 555, which can update the display content based on the identified hand gesture to create an interactive experience.

To identify hand 642 from image 640, the image processor of tracking module 550 can identify certain image features associated with hand 642 by searching for a pattern of pixel data corresponding to the image features. The image features may include, for example, skin texture, nail texture, etc. As discussed above, a pre-determined subset of the array of pixel cells (e.g., one pixel cell selected from each pixel cell blocks within the array of pixel cells) may be configured to generate pixel data representing spatial sub-samples of image 640. Based on the pixel data (e.g., by comparing the data with pre-determined pixel data patterns corresponding to an outline of a hand), the image processor can identify an ROI 650 including a set of pixels that are likely to contain the pixel data of hand 642. In the example of FIG. 6C, ROI 650 can be a rectangular shape represented by two corner co-ordinates (x1, y1) and (x2, y2). The image processor can then obtain pixel data from another subset of the array of pixel cells corresponding to the ROI (or from a frame buffer), and process the pixel data to identify hand 642. In some examples, additional read-out stages may be included where each read-out can have different sets of pixels and/or produce pixel data of different bit-depths, and the pixel data of the additional read-out stages may be provided to the image processor to identify hand 642 from image 640. With such arrangement, the image processor needs not process the pixel data of each and every pixel of images 640 to identify hand 642. Given that hand 642 typically only occurs a very small portion of image 640, such an arrangement can substantially reduce the volume of pixel data to be processed by the image processor in identifying hand 642, which can reduce power and bandwidth usage and improve the efficiency of the hand identification and tracking process. Moreover, since the system needs not process the full frame pixel data, the system latency can be reduced as well.

Figure 7:
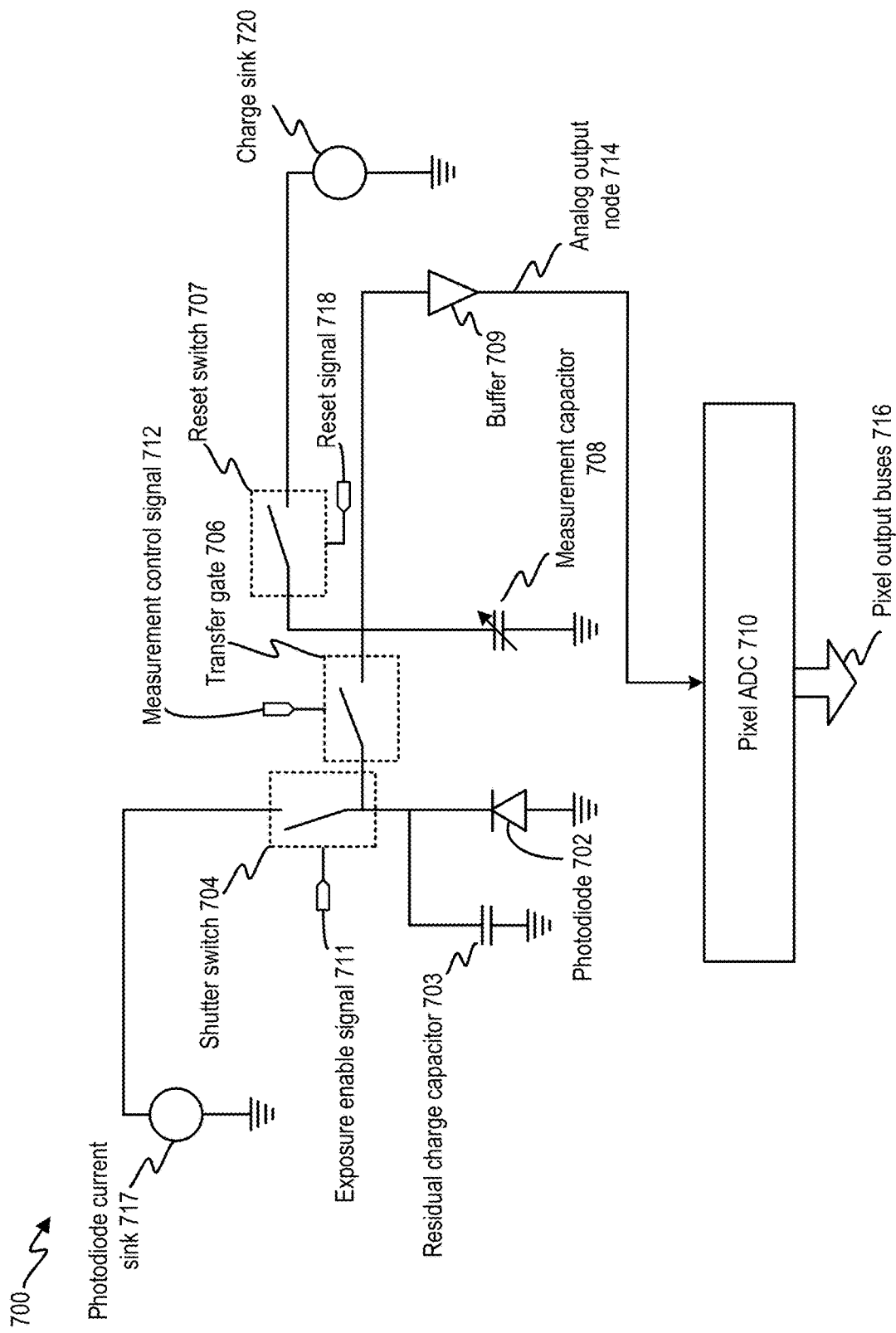
FIG. 7 illustrates block diagrams of embodiments of a pixel cell.

FIG. 7 illustrates an example of a pixel cell 700. Pixel cell 700 may be part of a pixel array and can generate digital intensity data corresponding to a pixel of an image. For example, pixel cell 700 may be part of pixel cells 402 of FIG. 4. As shown in FIG. 7, pixel cell 700 may include a photodiode 702, a residual charge capacitor 703, a shutter switch 704, a transfer gate 706, a reset switch 707, a measurement capacitor 708, a buffer 709, and a pixel ADC 710.

In some embodiments, photodiode 702 may include a P-N diode or a P-I-N diode. Each of shutter switch 704, transfer gate 706, and reset switch 707 can include a transistor. The transistor may include, for example, a metal-oxide-semiconductor field-effect transistor (MOSFET), a bipolar junction transistor (BJT), etc. Shutter switch 704 can act as an electronic shutter gate (in lieu of, or in combination with, mechanical shutter 404 of FIG. 4) to control an exposure period of pixel cell 700. During the exposure period, shutter switch 704 can be disabled (turned off) by exposure enable signal 611, which allows charge generated by photodiode 702 to move to residual charge capacitor 703 and/or measurement capacitor 708. At the end of the exposure period, shutter switch 704 can be enabled to steer the charge generated by photodiode 702 into photodiode current sink 717. Moreover, reset switch 707 can also be disabled (turned off) by reset signal 718, which allows measurement capacitor 708 to accumulate the charge and develop a voltage that reflects a quantity of the accumulated charge. After a mode of measurement completes, reset switch 707 can be enabled to empty the charge stored at measurement capacitor 708 to charge sink 720, to make measurement capacitor 708 available for the next measurement.

Residual charge capacitor 703 can be a device capacitor of photodiode 702 and can store charge generated by photodiode 702. Residual charge capacitor 703 can include, for example, a junction capacitor at the P-N diode junction interface, or other device capacitor(s) connected to photodiode 702. Due to the proximity of residual charge capacitor 703 to photodiode 702, charge generated by photodiode 702 may be accumulated at charge capacitor 703. Measurement capacitor 708 can be a device capacitor at a floating terminal of transfer gate 706, a metal capacitor, a MOS capacitor, or any combination thereof. Measurement capacitor 708 can be used to store a quantity of charge, which can be measured by pixel ADC 710 to provide a digital output representing the incident light intensity. The charge stored at measurement capacitor 708 can be either overflow charge (from photodiode 702) that are not to be accumulated at residual charge capacitor 703, or residual charge that are emptied from residual charge capacitor 703.

Figure 8:
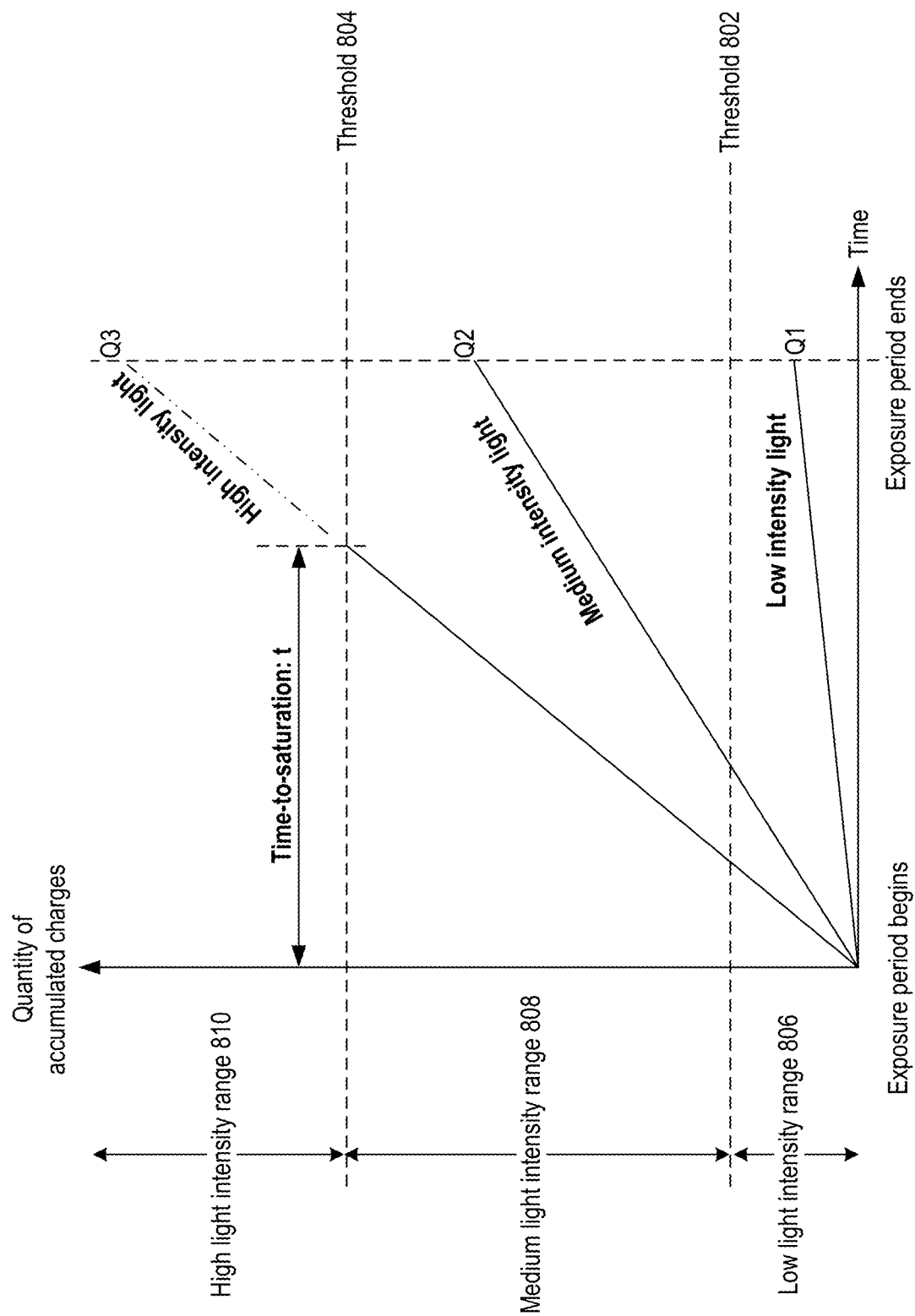
FIG. 8 illustrates operations for determining light intensities of different ranges by embodiments of FIG. 7.

Reference is now made to FIG. 8, which illustrates the charge accumulation operations at residual charge capacitor 703 and measurement capacitor 708 for different target light intensity ranges. FIG. 8 illustrates a total quantity of charge accumulated (or expected to accumulate) at residual charge capacitor 703 and measurement capacitor 708 with respect to time for different light intensity ranges. The total quantity of charge accumulated can reflect the total charge generated by photodiode 702 during an exposure period, which in turns reflects the intensity of light incident upon photodiode 702 during the exposure period. The quantity can be measured when the exposure period ends. A threshold 802 and a threshold 804 can be defined for thresholds quantity of charge defining a low light intensity range 806, a medium light intensity range 808, and a high light intensity range 810 for the intensity of the incident light. For example, if the total accumulated charge is below threshold 802 (e.g., Q1), the incident light intensity is within low light intensity range 806. If the total accumulated charge is between threshold 804 and threshold 802 (e.g., Q2), the incident light intensity is within medium light intensity range 808. If the total accumulated charge is above threshold 804, the incident light intensity is within high light intensity range 810.

Thresholds 802 and 804 can be set to control the accumulation of charge at residual charge capacitor 703 and measurement capacitor 708, to ensure that the quantity of accumulated charge at the capacitors correlates with the incident light intensity when the incident light intensity falls within either low light intensity range 806 or medium light intensity range 808. For example, thresholds 802 and 804 can be set below the capacities of residual charge capacitor 703 and measurement capacitor 708. As discussed above, once residual charge capacitor 703 and measurement capacitor 708 reaches full capacity, the capacitors may start leaking charge, and the voltage developed at the capacitors may not accurately represent or reflect the total number of charge generated by photodiode 702 during the exposure period. By setting thresholds 802 and 804 to below the capacities of residual charge capacitor 703 and measurement capacitor 708, measurement error caused by charge leakage can be avoided. In some examples, threshold 802 can be set at 2000e—(2000 charge), whereas threshold 804 can be set at 63000e—(63000 charge).

The accumulation of charge at residual charge capacitor 703 and measurement capacitor 708 can be controlled by thresholds 802 and 804. For example, an incident light intensity falling within low light intensity range 806 can be based on the total charge accumulated at residual charge capacitor 703. Assuming residual charge capacitor 703 is not yet full at the end of the exposure period, the total charge accumulated at residual charge capacitor 703 can reflect the total charge generated by photodiode 702 during the exposure period, and can be used to determine the incident light intensity. When the total charge accumulated at residual charge capacitor 703 exceeds threshold 802, the additional charge generated by photodiode 702 can be diverted to measurement capacitor 708 as overflow charge. Assuming measurement capacitor 708 is not yet full at the end of the exposure period, the total overflow charge accumulated at measurement capacitor 708 can also reflect the total charge generated by photodiode 702 during the exposure period, and can be used to determine the incident light intensity (which falls within medium light intensity range 808).

On the other hand, in a case where the incident light intensity is within high light intensity range 810, the total overflow charge accumulated at measurement capacitor 708 may exceed threshold 804 before the exposure period ends. As additional charge are accumulated, measurement capacitor 708 may reach full capacity before the end of the exposure period, and charge leakage may occur. To avoid measurement error caused due to measurement capacitor 708 reaching full capacity, a time-to-saturation measurement can be performed to measure the time duration it takes for the total overflow charge accumulated at measurement capacitor 708 to reach threshold 804. A rate of charge accumulation at measurement capacitor 708 can be determined based on a ratio between threshold 804 and the time-to-saturation, and a hypothetical quantity of charge (Q3) that could have been accumulated at measurement capacitor 708 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 810.

Referring back to FIG. 7, transfer gate 706 can be controlled by a measurement control signal 712 to control the charge accumulations at residual charge capacitor 703 and measurement capacitor 708 for different light intensity ranges as described above. For example, for low light intensity range 806, transfer gate 706 can be controlled to operate in a partially turned-on state. During the exposure period, the gate voltage of transfer gate 706 can set based on a voltage developed at residual charge capacitor 703 when the total accumulated charge at residual charge capacitor 703 reaches threshold 802. With such arrangements, the charge generated by photodiode 702 will be stored in residual charge capacitor 703 first until the quantity of accumulated charge reaches threshold 802. Right before the exposure period ends, transfer gate 706 can be controlled to operate in a fully turned-on state to move the charge stored in residual charge capacitor 703 to measurement capacitor 708. At the end of the charge transfer, transfer gate 706 can be controlled to operate in a fully turned-off state to preserve the charge stored in measurement capacitor 708. At that point, the charge stored in measurement capacitor 708 may represent the charge stored in residual charge capacitor 703, and can be used to determine the incident light intensity. On the other hand, for medium light intensity range 808 and high light intensity range 810, the overflow charge accumulated at measurement capacitor 708 can also be measured right before the exposure period ends, when the transfer gate 706 is still in a partially turned-on state and the charge stored in residual charge capacitor 703 are not yet transferred to measurement capacitor 708.

The charge accumulated at measurement capacitor 708 can be sensed by buffer 709 to generate a replica of the analog voltage (but with larger driving strength) at analog output node 714. The analog voltage at analog output node 714 can be converted into a set of digital data (e.g., comprising logical ones and zeros) by pixel ADC 710. The analog voltage developed at measurement capacitor 708 can be sampled and digital output can be generated before the end of the exposure period (e.g., for medium light intensity range 808 and high light intensity range 810), or after the exposure period (for low light intensity range 806). The digital data can be transmitted by a set of pixel output buses 716 to, for example, control circuitries 510 of FIG. 5, to represent the light intensity during the exposure period.

In some examples, the capacitance of measurement capacitor 708 can be configurable to improve the accuracy of light intensity determination for low light intensity range. For example, the capacitance of measurement capacitor 708 can be reduced when measurement capacitor 708 is used to measure the residual charge stored at residual charge capacitor 703. The reduction in the capacitance of measurement capacitor 708 can increase the charge-to-voltage conversion ratio at measurement capacitor 708, such that a higher voltage can be developed for a certain quantity of stored charge. The higher charge-to-voltage conversion ratio can reduce the effect of measurement errors (e.g., quantization error, comparator offset, noise associated with the buffer circuit, etc.) introduced by pixel ADC 710 on the accuracy of low light intensity determination. The measurement error can set a limit on a minimum voltage difference that can be detected and/or differentiated by pixel ADC 710. By increasing the charge-to-voltage conversion ratio, the quantity of charge corresponding to the minimum voltage difference can be reduced, which in turn reduces the lower limit of a measurable light intensity by pixel cell 700 and extends the dynamic range. On the other hand, for medium light intensity, the capacitance of measurement capacitor 708 can be increased to ensure that the measurement capacitor 708 has sufficient capacity to store a quantity of charge up to, for example, the quantity defined by threshold 804.

Figure 9:
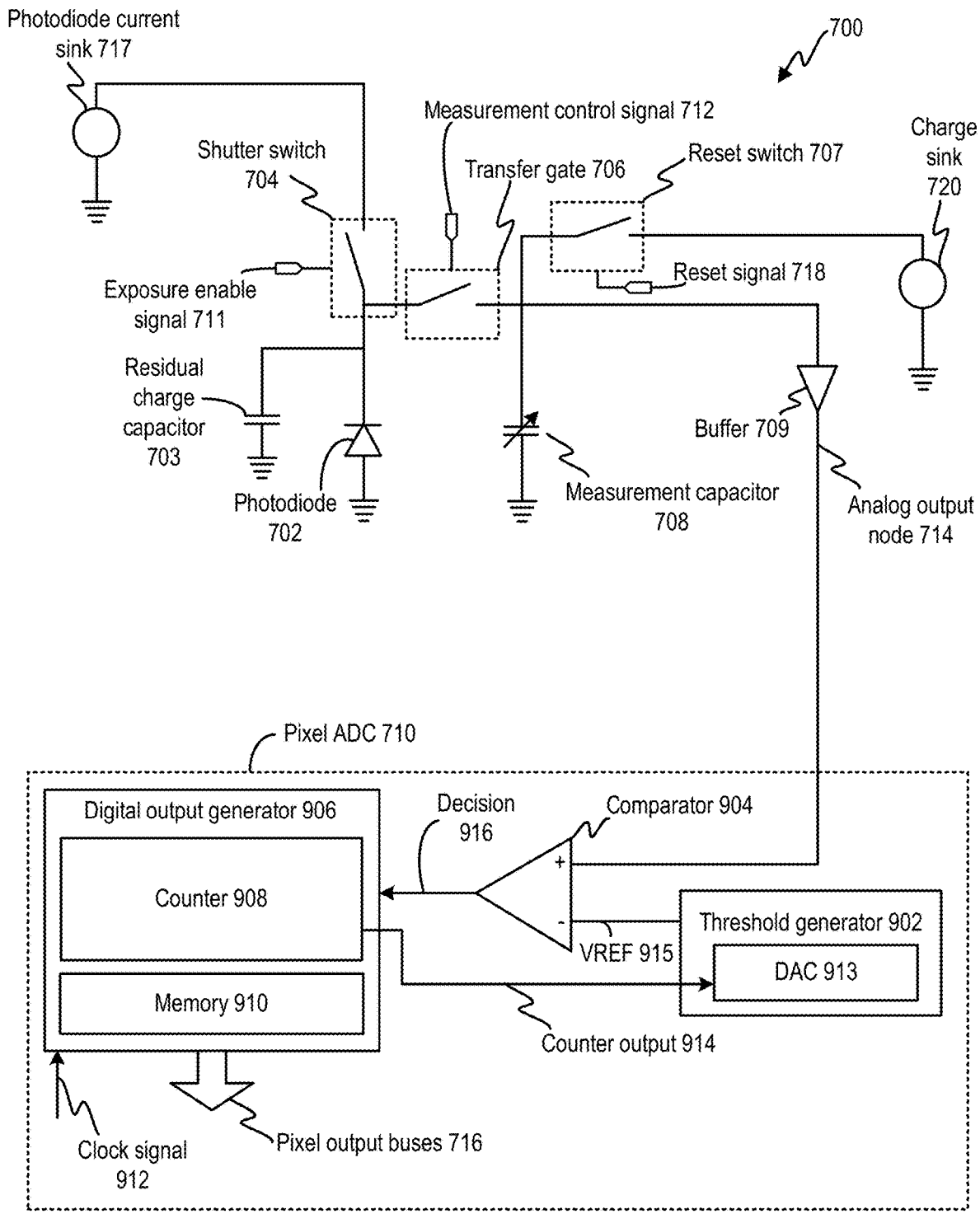
FIG. 9 illustrates examples of internal components of the pixel cell of FIG. 7.

FIG. 9 illustrates an example of the internal components of pixel ADC 710. As shown in FIG. 9, pixel ADC 710 includes a threshold generator 902, a comparator 904, and a digital output generator 906. Digital output generator 906 may further include a counter 908 and a memory 910. Counter 908 can generate a set of count values based on a free-running clock signal 912, whereas memory 910 can store at least some of the count values (e.g., the latest count value) generated by counter 908. In some embodiments, memory 910 may be part of counter 908. Memory 910 can be, for example, a latch circuit to store the counter value based on local pixel value as described below. Threshold generator 902 includes a digital-to-analog converter (DAC) 913 which can accept a set of digital values and output a reference voltage (VREF) 915 representing the set of digital values. As to be discussed in more detail below, threshold generator 902 may accept static digital values to generate a fixed threshold, or accept output 914 of counter 908 to generate a ramping threshold.

Although FIG. 9 illustrates that DAC 913 (and threshold generator 902) is part of pixel ADC 710, it is understood that DAC 913 (and threshold generator 802) can be coupled with multiple digital output generators 906 from different pixel cells. Moreover, digital output generator 906 (and pixel ADC 710) can also be shared among a plurality of multiple pixel cells to generate the digital values.

Comparator 904 can compare the analog voltage developed at analog output node 714 against the threshold provided by threshold generator 902, and generate a decision 916 based on the comparison result. For example, comparator 904 can generate a logical one for decision 916 if the analog voltage at analog output node 714 equals to or exceeds the threshold generated by threshold generator 902. Comparator 904 can also generate a logical zero for decision 916 if the analog voltage falls below the threshold. Decision 916 can control the counting operations of counter 908 and/or the count values stored in memory 910, to perform the aforementioned time-of-saturation measurement of a ramping analog voltage at analog output node 714 as well as quantization processing of the analog voltage at analog output node 714 for incident light intensity determination.

As to be discussed in more detail below, some or all of the counter values stored in memory 910, as well as decision 916, can be provided to an image processor of tracking module 550 (e.g., via pixel output buses 716) for determination of ROI to identify an object. For example, a first set of pixel cells can provide, to tracking module 550, the counter values stored in their memory 910 and/or decisions 916. The counter values and decisions 916 are generated based on an intensity of light received by the first set of pixel cells within an exposure period. Based on the counter values and/or decision 916 satisfying pre-determined criteria (e.g., the counter values and/or decision 916 indicating that the light intensity exceeds a pre-determined threshold, a pattern associated with a pre-determined object is matched, etc.), the image processor can determine a second set of pixel cells surrounding (and/or including) the first set of pixel cells. The second set of pixel cells may correspond to the pixel locations of an ROI that is likely to include pixel data of an object. For example, referring back to the example of FIG. 6A, the first set of pixel cells may correspond to center locations of the dots in images 610a/610b, whereas the second set of pixel cells may correspond to circular regions (of a predetermined diameter) surrounding the center locations of the dots and are likely to generate pixel data of the dots. The image processor can then obtain the counter values from the second set of pixel cells. The counter values from the second set of pixel cells are generated in the same exposure period as the counter values and/or decision 916 of the first set of pixel cells. The image processor can determine the counter values (and the corresponding pixel cells) that correspond to the dots based on whether the counter values represent light intensities that exceed a pre-determined threshold, and update an estimation of the image positions of the dots.

Figures 10A, 10B:
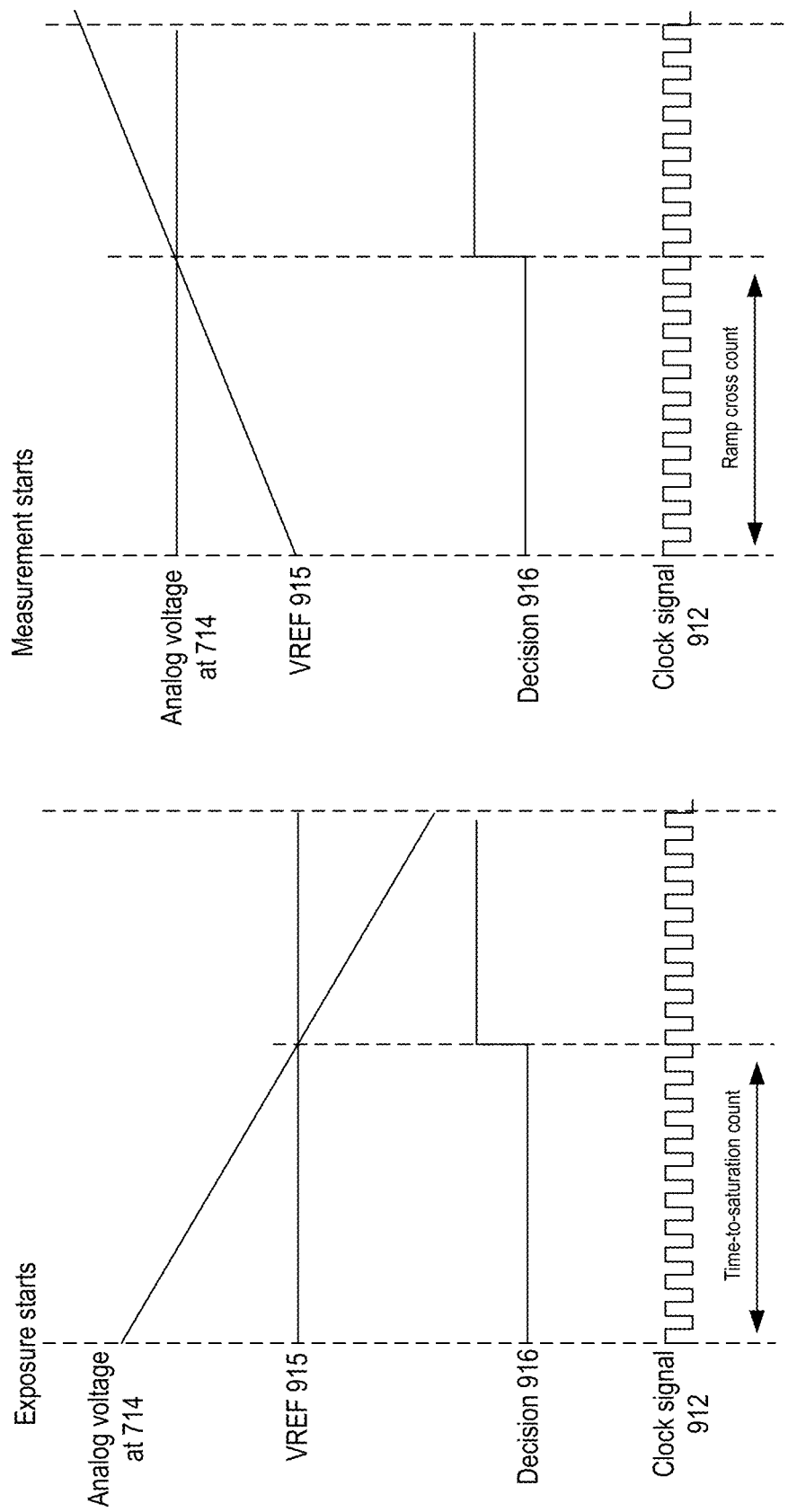
FIGS. 10A, 10B, 10C, and 10D illustrate techniques for quantizing a light intensity.

FIG. 10A illustrates an example of time-to-saturation measurement by pixel ADC 710. To perform the time-to-saturation measurement, threshold generator 802 can control DAC 813 to generate a fixed VREF 915. Fixed VREF 915 can be set at a voltage corresponding a charge quantity threshold between the medium light intensity range and the high light intensity range (e.g., threshold 804 of FIG. 8). Counter 908 can start counting right after the exposure period starts (e.g., right after shutter switch 704 is disabled).

As the analog voltage at analog output node 714 ramps down (or up depending on the implementation), clock signal 912 keeps toggling to update the count value at counter 908. The analog voltage may reach the fixed threshold at a certain time point, which causes decision 916 by comparator 904 to flip. The flipping of decision 916 may stop the counting of counter 908, and the count value at counter 908 may represent the time-to-saturation, with a smaller count value indicating a higher rate of charge accumulation and a higher light intensity.

In some examples, decision 916 generated from a time-to-saturation measurement can be provided to the image processor of tracking module 550 for ROI determination. For example, to identify an object or an event associated with a high light intensity (e.g., the dot patterns in the example of FIG. 6A, glint patch 632 of FIG. 6B, etc.), the image processor may obtain decisions 916 generated from time-of-saturation measurement from each pixel cell of a pixel array. A positive decision 916 (e.g., a digital one) may indicate that an intensity of light received at the pixel cell within an exposure period exceeds a saturation threshold (e.g., threshold 804), and the light received by that pixel cell is likely from an object or an event of interest (e.g., a dot, a glint patch, etc.). The image processor can then identify a first set of pixel cells that provide positive decisions 916 and determine, based on the locations of the first set of pixel cells, a second set of pixel cells corresponding to an ROI for detection of the object or the event.

FIG. 10B illustrates an example of quantizing an analog voltage by pixel ADC 710. After measurement starts, DAC 913 may be programmed by counter output 914 to generate a ramping VREF 915, which can either ramp up (in the example of FIG. 10B) or ramp down depending on implementation. In the example of FIG. 10B, the quantization process can be performed with uniform quantization steps, with VREF 915 increasing (or decreasing) by the same amount for each clock cycle of clock signal 912. The amount of increase (or decrease) of VREF 915 corresponds to a quantization step. When VREF 915 reaches within one quantization step of the analog voltage at analog output node 714, decision 916 by comparator 904 flips. The flipping of decision 916 may stop the counting of counter 908, and the count value can correspond to a total number of quantization steps accumulated to match, within one quantization step, the analog voltage. The count value can become a digital representation of the quantity of charge stored at measurement capacitor 708, as well as the digital representation of the incident light intensity. As discussed above, the quantization of the analog voltage can occur during the exposure period (e.g., for medium light intensity range 808) and after the exposure period (e.g., for low light intensity range 806).

In some examples, decision 916 as well as the count value generated from the quantization of the analog voltage at analog output node 714 can also be provided to the image processor for ROI determination. As an illustrative example, a combination of decisions 916 of the time-of-saturation measurement and of the quantization of the analog voltage at analog output node 714, received from each pixel cell, can be used to create a coarse light intensity distribution map. The combinations of decisions 916 may indicate, for example, whether a pixel cell receives high intensity light of which the intensity exceeds threshold 804, medium intensity light of which the intensity falls between threshold 802 and threshold 804, or low intensity light of which the intensity falls below threshold 802. The coarse light intensity distribution map can be used to detect, for example, a shape of an object to be identified (e.g., the shape of hand 642 of FIG. 6C). Based on the detected shape, the image processor can determine ROI 650 including a set of pixels that are likely to contain the pixel data of hand 642. The image processor can then obtain the count values from a set of pixel cells corresponding to the pixel locations within ROI 650, and process those count values to identify the pixels corresponding to ROI 650. As another illustrative example, each pixel cell can also provide a subset of bits (e.g., a pre-determined number of MSBs) of the count values generated from the quantization of the analog voltage at analog output node 714. The subset of bits can be used to generate the coarse light intensity distribution map for ROI determination.

Figures 10C, 10D:
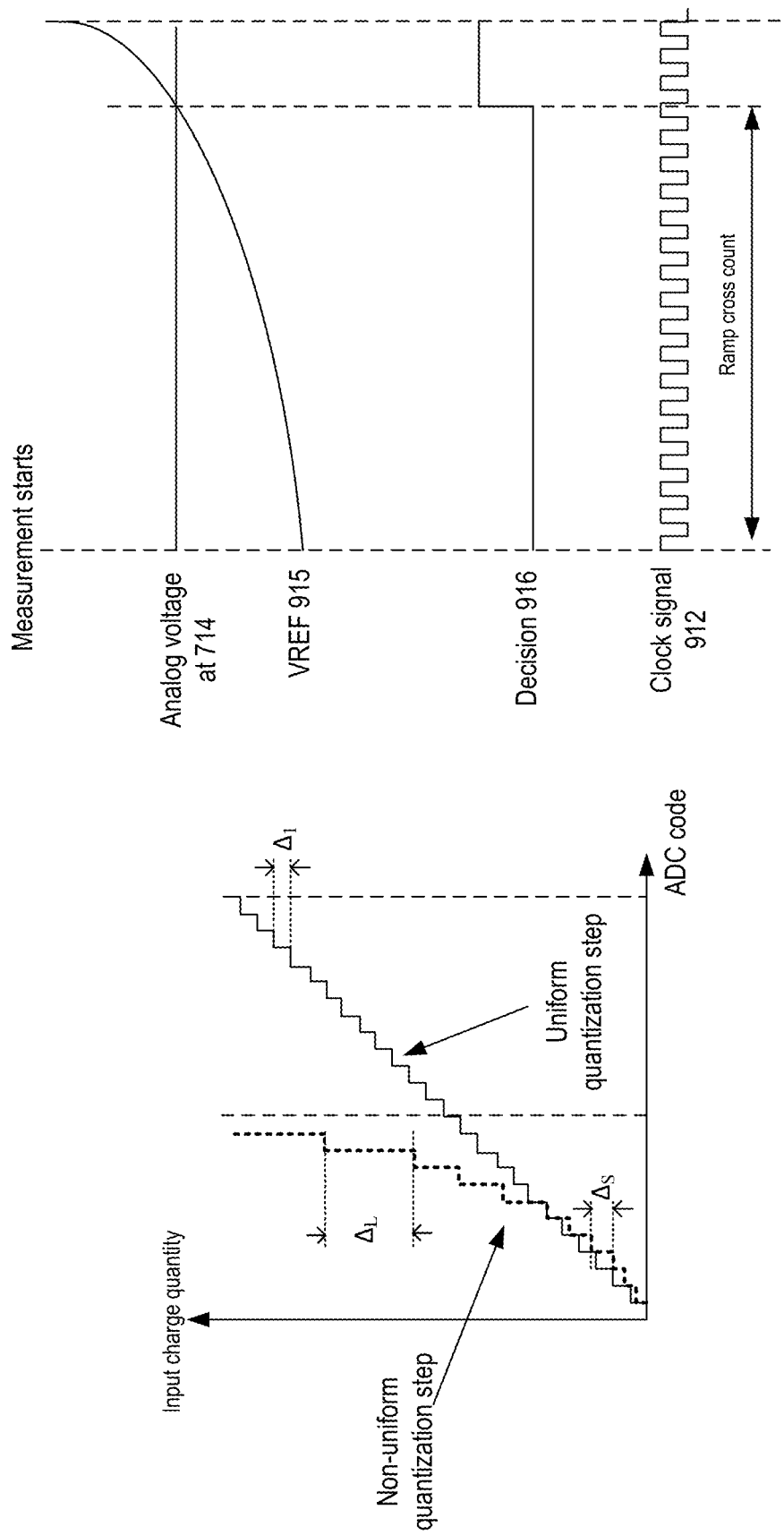

As discussed above, ADC 710 can introduce quantization errors when there is a mismatch between a quantity of charge represented by the quantity level output by ADC 710 (e.g., represented by the total number of quantization steps) and the actual input quantity of charge that is mapped to the quantity level by ADC 710. One way to reduce quantization error can be by employing a non-uniform quantization scheme, in which the quantization steps are not uniform across the input range. FIG. 10C illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 710 can be reduced. Therefore, the reduced quantization errors can push down the lower limit of the measurable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, higher bandwidth requirement, reduction in processing speed, etc.) can be avoided.

FIG. 10D illustrates an example of quantizing an analog voltage by pixel ADC 710 using a non-uniform quantization process. Compared with FIG. 10B (which employs a uniform quantization process), VREF 915 increases in a non-linear fashion with each clock cycle, with a swallower slope initially and a steeper slope at a later time. The differences in the slopes are attributed to the uneven quantization step sizes. For lower counter count values (which correspond to a lower input quantity range), the quantization steps are made smaller, hence VREF 915 increases at a slower rate. For higher counter count values (which correspond to a higher input quantity range), the quantization steps are made larger, hence VREF 915 increases at a higher rate. The uneven quantization steps in VREF 915 can be introduced using different schemes. For example, as discussed above, DAC 913 is configured to output voltages for different counter count values (from counter 908). DAC 913 can be configured such that the difference in the output voltage between two neighboring counter count values (which defines the quantization step size) is different for different counter count values. As another example, counter 908 can also be configured to generate jumps in the counter count values, instead of increasing or decreasing by the same count step, to generate the uneven quantization steps. In some examples, the non-uniform quantization process of FIG. 10D can be employed for light intensity determination for low light intensity range 806 and medium light intensity range 808.

Figure 11:
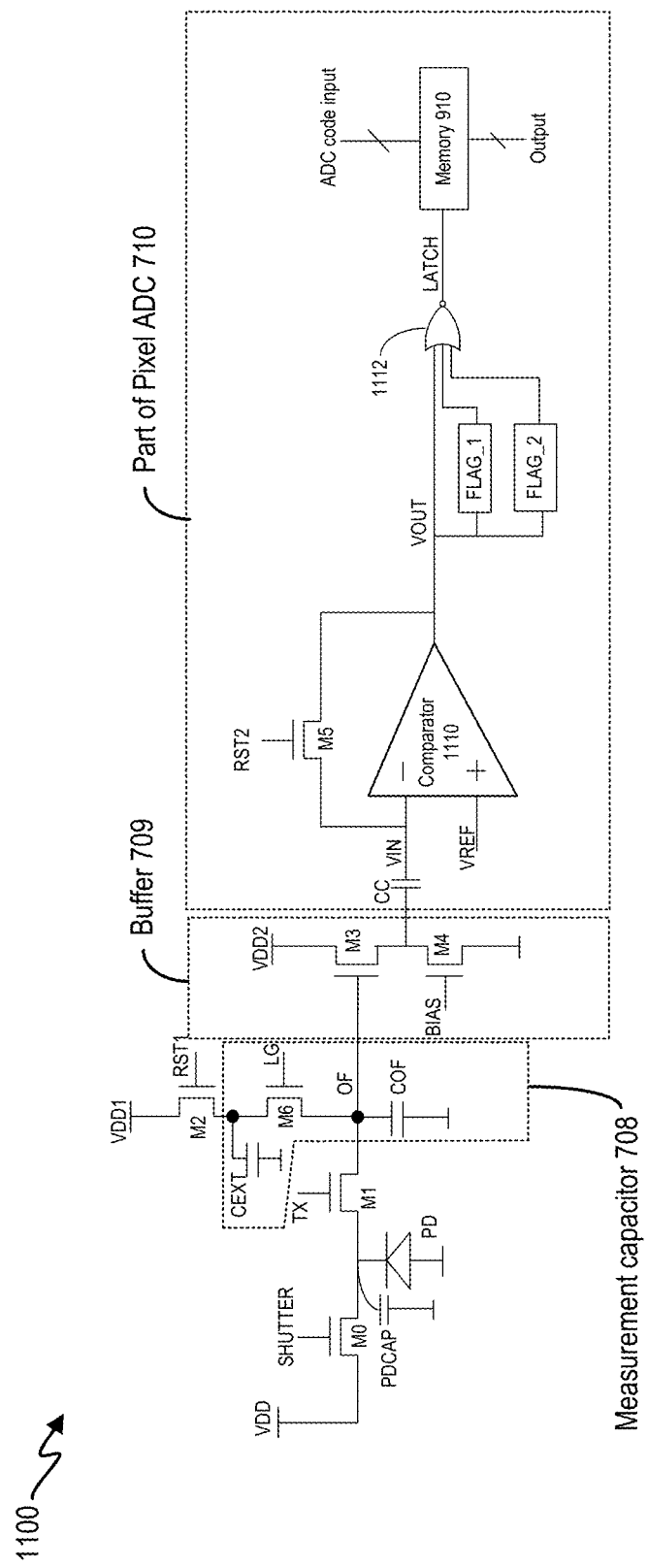
FIG. 11 illustrates block diagrams of an embodiment of a pixel cell.

Reference is now made to FIG. 11, which illustrates an example of pixel cell 1100, which can be an embodiment of pixel cell 700 of FIG. 7. In the example of FIG. 11, PD can correspond to photodiode 702, transistor M0 can correspond to shutter switch 704, transistor M1 can correspond to transfer gate 706, whereas transistor M2 can correspond to reset switch 707. Moreover, PDCAP can correspond to residual charge capacitor 703, whereas a combination of COF and CEXT capacitors can correspond to measurement capacitor 708. The capacitance of measurement capacitor 708 is configurable by the signal LG. When LG is enabled, measurement capacitor 708 provides combined capacities of COF and CEXT capacitors. When LG is disabled, CEXT capacitor can be disconnected from the parallel combination, and measurement capacitor 708 comprises only COF capacitor (plus other parasitic capacitances). As discussed above, the capacitance of measurement capacitor 708 can be reduced to increase the charge-to-voltage conversion ratio for the low light intensity determination, and can be increased to provide the requisite capacity for the medium light intensity determination.

Pixel cell 1100 further includes an example of buffer 709 and an example of pixel ADC 710. For example, transistors M3 and M4 form a source follower which can be buffer 709 of FIG. 7 to buffer an analog voltage developed at the OF node, which represents a quantity of charge stored at the COF capacitor (or at the COF and CEXT capacitors). Further, the CC cap, comparator 1110, transistor M5, NOR gate 1112, together with memory 910, can be part of pixel ADC 710 to generate a digital output representing the analog voltage at the OF node. As described above, the quantization can be based on a comparison result (VOUT), generated by comparator 1110, between the analog voltage developed at the OF node and VREF. Here, the CC cap is configured to generate a VIN voltage (at one input of comparator 1110) which tracks the output of buffer 709, and provides the VIN voltage to comparator 1110 to compare against VREF. VREF can be a static voltage for time-of-saturation measurement (for high light intensity range) or a ramping voltage for quantization of an analog voltage (for low and medium light intensity ranges). The ADC code input can be generated by a free-running counter (e.g., counter 908), and the comparison result generated by comparator 1110 can determine the ADC code input to be stored in memory 910 and to be output as the digital representation of the incident light intensity. In some examples, the generation of VREF for low and medium light intensity determination can be based on a non-uniform quantization scheme as discussed in FIG. 10C and FIG. 10D.

Pixel cell 1100 includes techniques that can further improve the accuracy of the incident light intensity determination, in addition to the techniques disclosed above. For example, the combination of the CC cap and transistor M5 can be used to compensate for measurement errors (e.g., comparator offset and various noise) introduced by comparator 1110, as well as other error signals that are introduced to comparator 1110, such that the accuracy of comparator 1110 can be improved. The noise signals may include, for example, reset noise charge introduced by reset switch 707, a noise signal at the output of buffer 709 due to source follower threshold mismatches, etc. A quantity of charge reflecting the comparator offset as well as the error signals can be stored at the CC cap during a reset phase, when both transistors M2 and M5 are enabled. A voltage difference can also be developed across the CC cap during the reset phase due to the stored charge. During a measurement phase, the voltage difference across the CC cap remains, and the CC cap can track the output voltage of buffer 709 by subtracting away (or adding) the voltage difference to generate VIN. As a result, the VIN voltage can be compensated for the measurement errors and the error signals, which improves the accuracy of the comparison between VIN and VREF and the ensuing quantization.

In some examples, pixel cell 1100 can be operated in either a three-phase measurement process or a two-phase measurement process. The three-phase measurement process can be used for identifying textures or other image features of a physical object, such as hand 642. Each of the three phases can correspond one of the three light intensity ranges of FIG. 8 (e.g., low light intensity range 806, medium light intensity range 808, and high light intensity range 810). On the other hand, the two-phase measurement process can be used for identifying an image of an object or an event generated from light of low light intensity range 806 and light of high light intensity range 810, but not from light of medium light intensity range 808. The two-phase measurement process can be used for, for example, detection of pixel data corresponding to glint patch 632 (which are likely in high light intensity range 810) and pixel data corresponding to pupil 634 (which are likely in low light intensity range 806), detection of dot patterns of infra-red lights (which are likely in high light intensity range 810), etc. By skipping one phase of measurement, the total duration of the measurement process can be reduced, which allows both power consumption and output latency to be reduced. Moreover, by using a set of bits to represent the low light intensity range 806 instead of a combined (and larger) range including low light intensity range 806 and medium light intensity range 808, the quantization error can be reduced, and the accuracy of detecting objects of low light intensity (e.g., pupil 634) can be improved as a result.

In each phase of the three-phase or two-phase measurement processes, pixel cell 1100 can be operated in a measurement mode targeted for the corresponding light intensity range, and determine whether the incident light intensity falls within the corresponding light intensity range based on the output of comparator 1110. If the incident light intensity falls within the corresponding light intensity range, pixel cell 1100 can latch the ADC code input (from counter 908) into memory 910, and put a lock (using a combination of the FLAG_1 and FLAG_2 signals) on memory 910 to prevent subsequent measurement phases from overwriting memory 910. At the end of the two-phase or three-phase measurement processes, the ADC code input stored in memory 910 can then be provided as the digital output representing the incident light intensity.

Figure 12A:
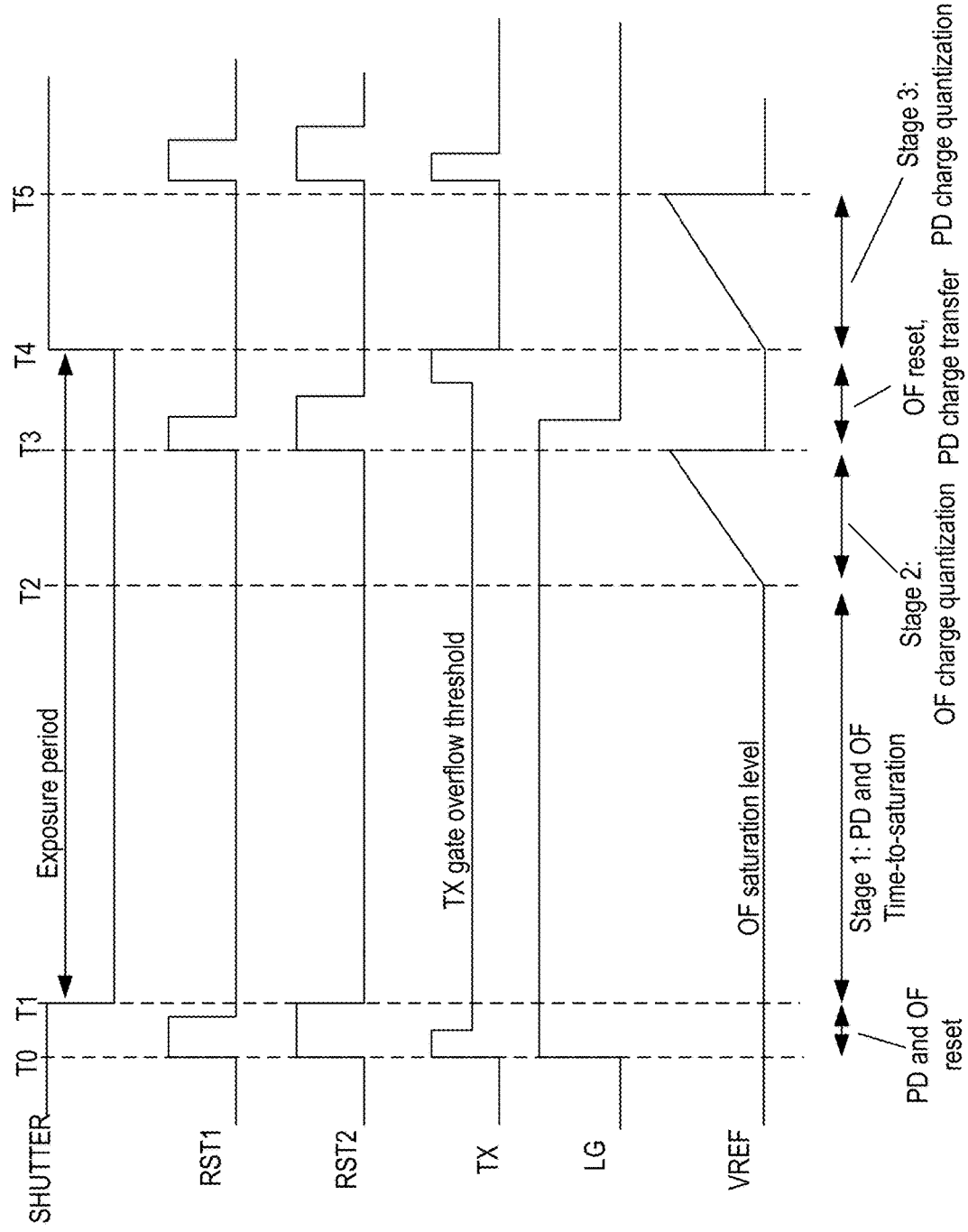
FIGS. 12A, 12B, 12C, and 12D illustrate example methods for determining light intensity.

Reference is now made to FIGS. 12A-12D, which illustrate the change of the control signals of pixel cell 1100 for a three-phase measurement process with respect to time. Referring to FIG. 12A, the time period between T0 and T1 corresponds to a first reset phase, whereas the time period between T1 and T4 corresponds to the exposure period. Within the exposure period, the time period between T1 and T2 corresponds to a first phase of measurement for a high light intensity range (e.g., high light intensity range 810), the time period between T2 and T3 corresponds to a second phase of measurement for a medium light intensity range (e.g., medium light intensity range 808), whereas the time period between T3 and T4 corresponds to a second reset phase. Moreover, the time period between T4 and T5 corresponds to a third phase of measurement for a low light intensity range (e.g., low light intensity range 806). Pixel cell 1100 can provide the digital output representing the incident light intensity at time T5, and then start the next three-phase measurement process.

As shown in FIG. 12A, during the time period between T0 and T1 both RST1 and RST2 signals, as well as the LG signal, the TX signal, and the shutter signal, are asserted. As a result, the charge stored in the PDCAP capacitor, the CEXT capacitor, and the COF capacitor are removed. Moreover, no charge are added to the capacitors because the charge generated by photodiode PD are diverted away by transistor M0. Further, comparator 1110 is also in a reset phase, and the CC capacitor can store charge reflecting the reset noise introduced by M2, the comparator offset, the threshold mismatch of buffer 709, etc. Towards the end of the period, the TX gate is biased at a threshold level to trap a pre-determined number of charge (e.g., threshold 802) at PDCAP. The threshold level can be set based on a voltage corresponding to the pre-determined number of charge.

Figures 12B, 12C:
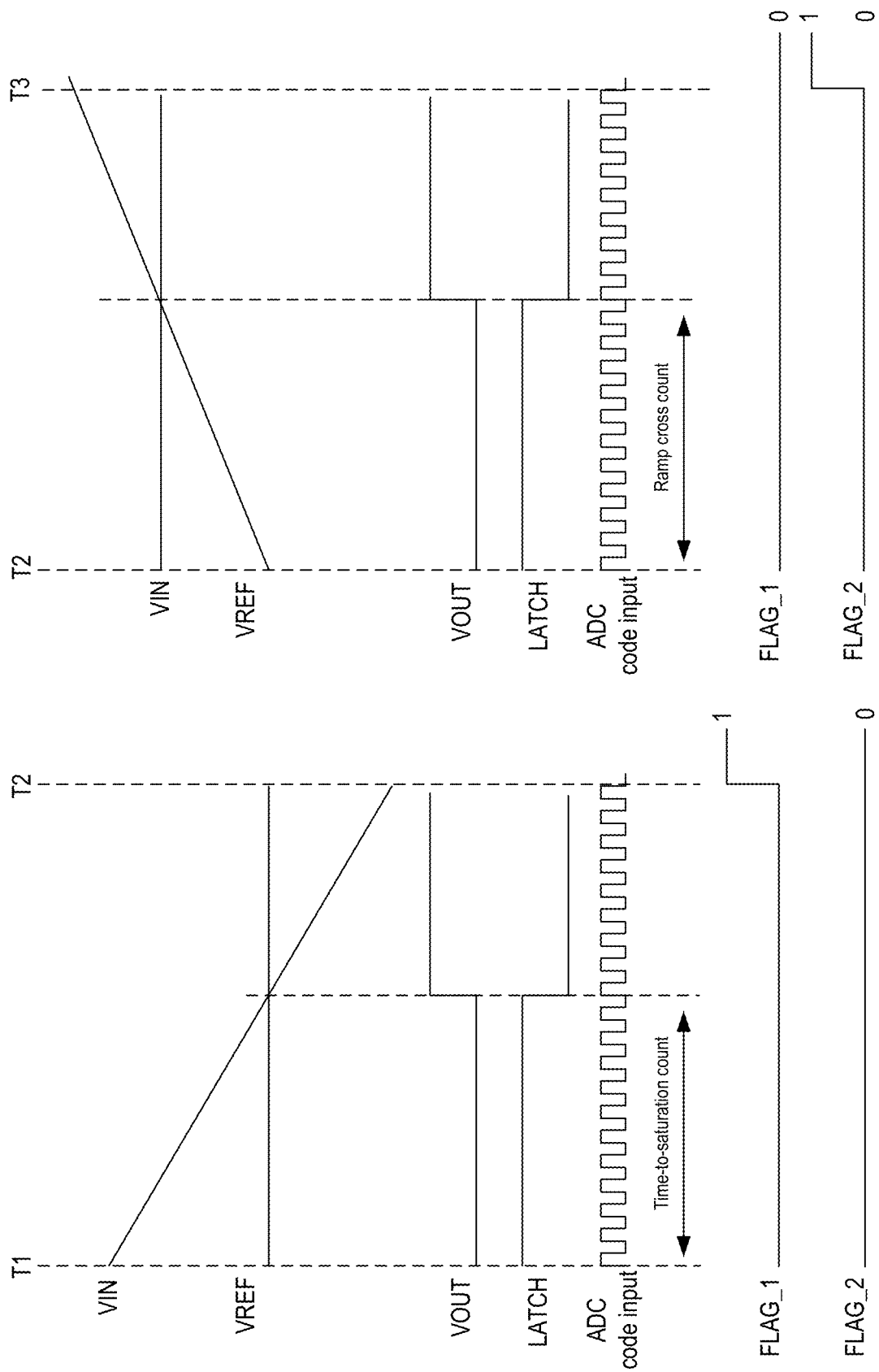

During the time period between T1 and T2, the shutter signal is de-asserted and the LG signal remains asserted, which allow the charge generated by the PD photodiode to flow into the PD capacitor and, if the voltage developed at the PD capacitor exceeds the threshold level set by TX, to flow into the COF capacitor and the CEXT capacitor. FIG. 12B illustrates the measurement operations performed by ADC 710 during that time period. As shown in FIG. 12B, ADC 710 can perform the time-to-saturation measurement, and the buffered and error-compensated version of analog voltage at the OF node (VIN) can be compared against a threshold voltage representing a quantity of charge of threshold 804 while counter 908 is free-running. If the total charge stored at the COF capacitor and the CEXT capacitor exceeds threshold 804 (based on the OF node voltage), comparator 1110 will trip, and the count value generated by counter 908 at the time of tripping can be stored into memory 910. The tripping of comparator 1110 also causes a register storing FLAG_1 to store a value of 1. The non-zero FLAG_1 value can cause the output of NOR gate 1112 to remain low regardless of other inputs to the NOR gate, and can lock the memory and prevent subsequent measurement phases from overwriting counter 908. On the other hand, if comparator 1110 never trips during the time period between T1 and T2, which indicates that the incident light intensity is below the high light intensity range, FLAG_1 stays zero. FLAG_2, which can be updated by subsequent measurement phases, stays at zero regardless of whether comparator 1110 trips.

During the time period between T2 and T3, which corresponds to the second phase of measurement, the analog voltage at the OF node can be quantized by ADC 710. FIG. 12C illustrates the measurement operations performed by ADC 710 during that time period. As shown in FIG. 12C, a ramping VREF can be supplied to comparator 1110 to be compared against the buffered and error-compensated version of analog voltage at the OF node (VIN). Although FIG. 12C shows a ramping VREF corresponding to a uniform quantization process, it is understood that the ramping VREF can also include non-uniform slopes corresponding to a non-uniform quantization process as described with respect to FIG. 10B. The second phase of measurement ends at T3, by which time the ADC input codes representing the entire medium incident light range have been cycled through. If the ramping VREF matches VIN (within one quantization step), comparator 1110 will trip, and the count value generated by counter 908 at the time of tripping can be stored into memory 910, if the memory is not locked by the first phase of measurement (as indicated by the zero value of FLAG_1). If the memory is locked, the count value will not be stored into memory 910. On the other hand, if the memory is not locked, the count value generated by counter 908 at the time of tripping can be stored into memory 910, and the memory can be locked by writing a value of 1 to a register storing FLAG_2.

At the beginning of the time period between T3 and T4, both RST1 and RST2 signals can be asserted again for a second reset phase. The purpose of the second reset phase is to reset the CEXT and COF capacitors, and to prepare the COF capacitor for storing charge transferred from the PDCAP capacitor in the third phase of measurement (for low light intensity range). The LG signal can also be de-asserted to disconnect the CEXT capacitor from the COF capacitor and to reduce the capacitance of measurement capacitor 708. The reduction of the capacitance is to increase the charge-to-voltage conversion ratio to improve the low light intensity determination, as discussed above. Comparator 1110 is also put into the reset state where the CC cap can be used to store the noise charge generated by the resetting of the CEXT and COF capacitors. Towards time T4, after the resetting completes, the RST1 and RST2 signals are de-asserted, whereas the bias TX can increase to fully turn on transistor M1. The charge stored in the PD cap can then move into the COF capacitor via M1.

Figure 12D:
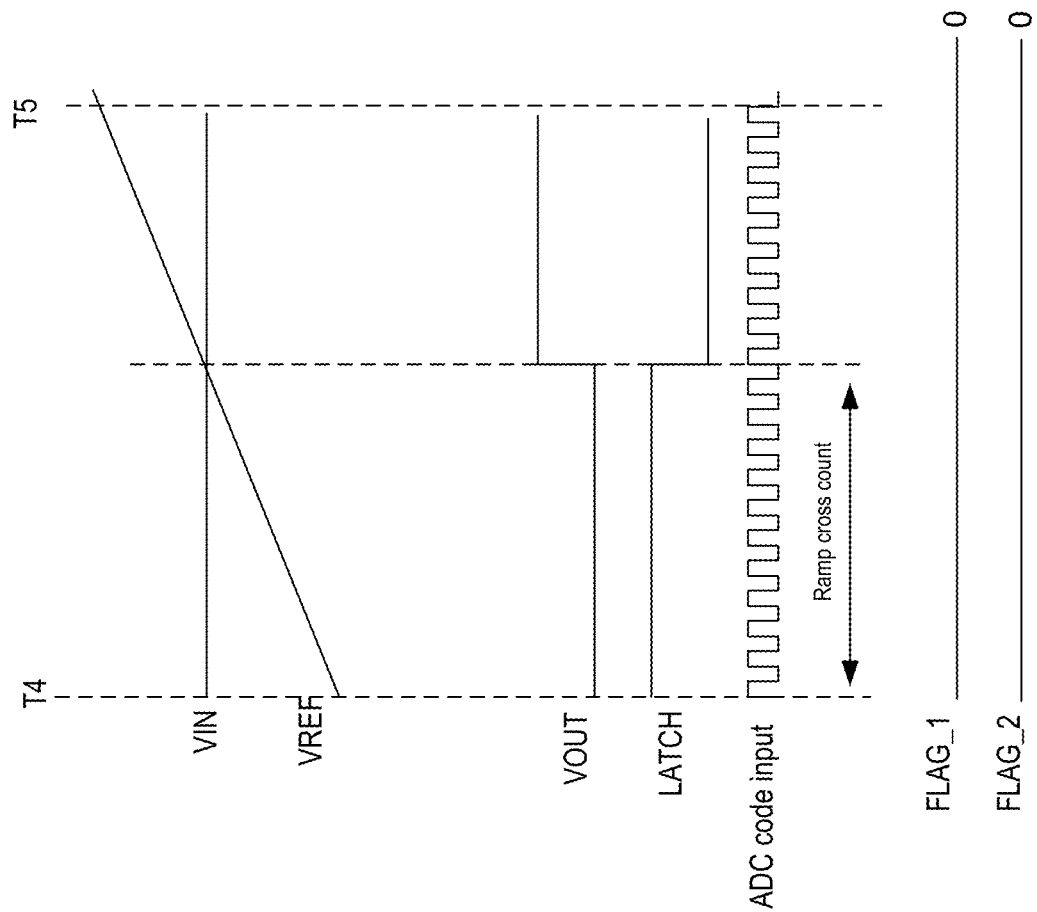

During the time period between T4 and T5, the third phase of measurement is performed for the low light intensity range. During that period, the shutter signal is asserted to end the exposure period, whereas the TX signal is de-asserted to disconnect the PDCA capacitor and the PD photodiode from the COF capacitor, to ensure that that the COF capacitor, during the time of measurement, only stores the charge stored in the PDCAP capacitor during the exposure period. FIG. 12D illustrates the measurement operations performed by ADC 710 during that time period. As shown in FIG. 12D, a ramping VREF can be supplied to comparator 1110 to be compared against the buffered and error-compensated version of analog voltage at the OF node (VIN). Although FIG. 12D shows a ramping VREF corresponding to a uniform quantization process, it is understood that the ramping VREF can also include non-uniform slopes corresponding to a non-uniform quantization process as described with respect to FIG. 10D. The third phase of measurement ends at T5, by which time the ADC input codes representing the entire low incident light range have been cycled through. As shown in FIG. 12D, if the ramping VREF matches VIN (within one quantization step), comparator 1110 will trip, and the count value generated by counter 908 at the time of tripping can be stored into memory 910, if the memory is not locked by the first and second phases of measurement (as indicated by the zero values of FLAG_1 and FLAG_2). If the memory is locked, the count value will not be stored into memory 910. The count value stored in memory 910 can then be provided as a digital output representing the incident light intensity.

In some examples, the values of FLAG_1 and FLAG_2 (which can correspond to decisions 916 of FIG. 10A and FIG. 10B) can be provided to the image processor for ROI determination. For example, the assertion of FLAG_1 at a first set of pixel cells can indicate that the first set of pixel cells receive the light of an object or an event associated with a high light intensity (e.g., the dot patterns in the example of FIG. 6A, glint patch 632 of FIG. 6B, etc.) in an exposure period. The image processor can then determine, based on the locations of the first set of pixel cells, a second set of pixel cells corresponding to an ROI for detection of the object or the event. The image processor can then receive the count values (generated for the same exposure period) stored in the memory 910 of the second set of pixel cells. In some examples, a combination of FLAG_1 and FLAG 2 values can be used to construct a coarse light intensity distribution map from which an ROI for an object can be determined, as discussed above. By providing a one-bit value (e.g., FLAG 1 value only) or a two-bit value (e.g., a combination of FLAG_1 and FLAG 2 values) as a coarse measurement of light intensity to the image processor, which can then determine a subset of pixel cells from which to receive the full bit-depth pixel data, the volume of pixel data to be transferred to and processed by the image processor can be greatly reduced. As a result, the object identification processing can be performed more efficiently and can be performed with lower power and computation bandwidth.

Figure 13:
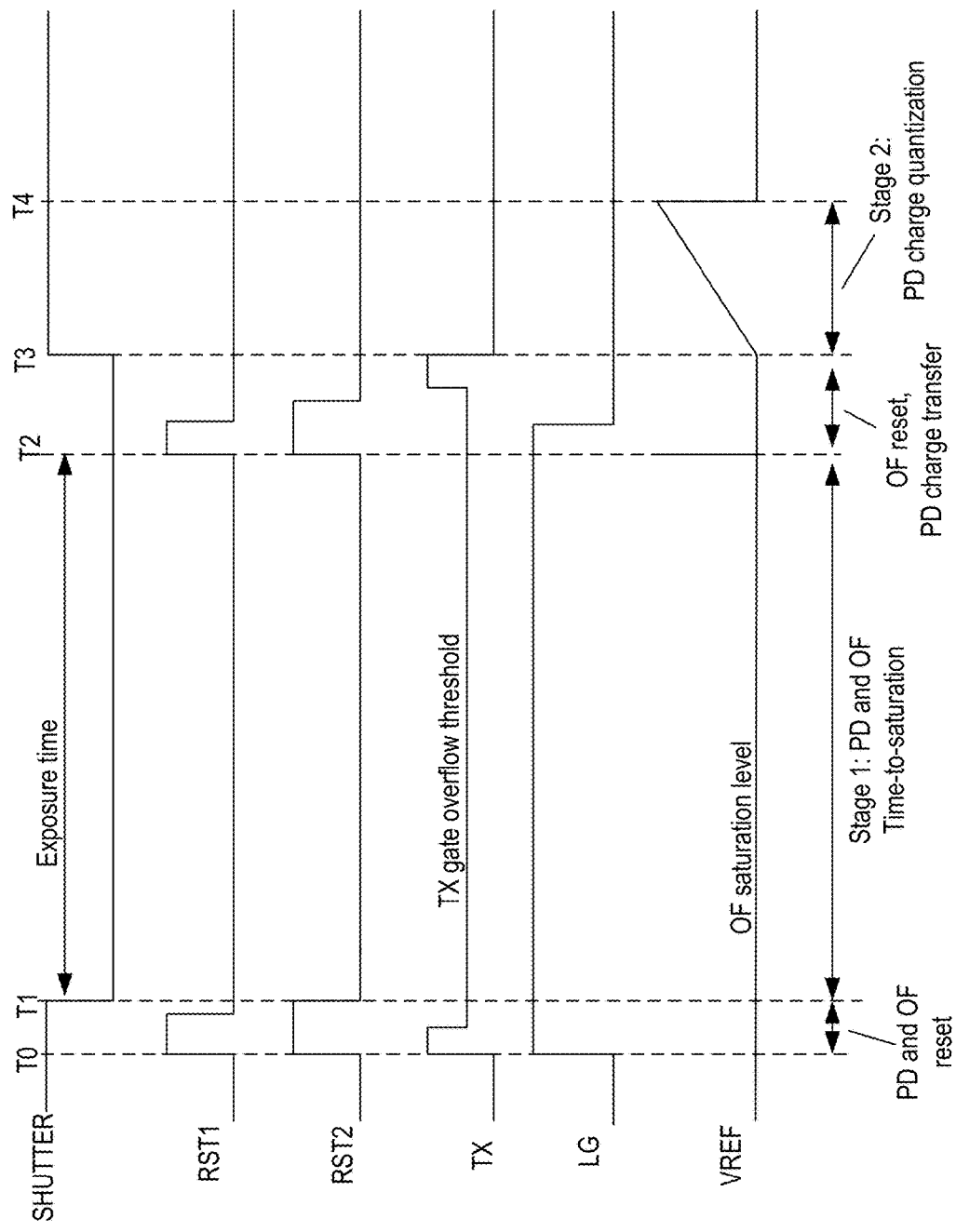
FIG. 13 illustrates another example methods for determining light intensity.

Reference is now made to FIG. 13, which illustrate the change of the control signals of pixel cell 1100 for a two-phase measurement process with respect to time. Referring to FIG. 13, the time period between T0 and T1 corresponds to a first reset phase, whereas the time period between T1 and T2 corresponds to the exposure period. Within the exposure period a first phase of measurement for a high light intensity range (e.g., high light intensity range 810) can be performed. Moreover, the time period between T2 and T3 corresponds OF reset and PD charge transfer, whereas the time period between T3 and T4 corresponds to a second phase of measurement for a low light intensity range (e.g., low light intensity range 810), with the measurement phase for medium light intensity range skipped. The operations of pixel cell 1100 in each phase of measurement are similar to as discussed with respect to FIG. 12B and FIG. 12D, the detail of which are not repeated here.

Figure 14:
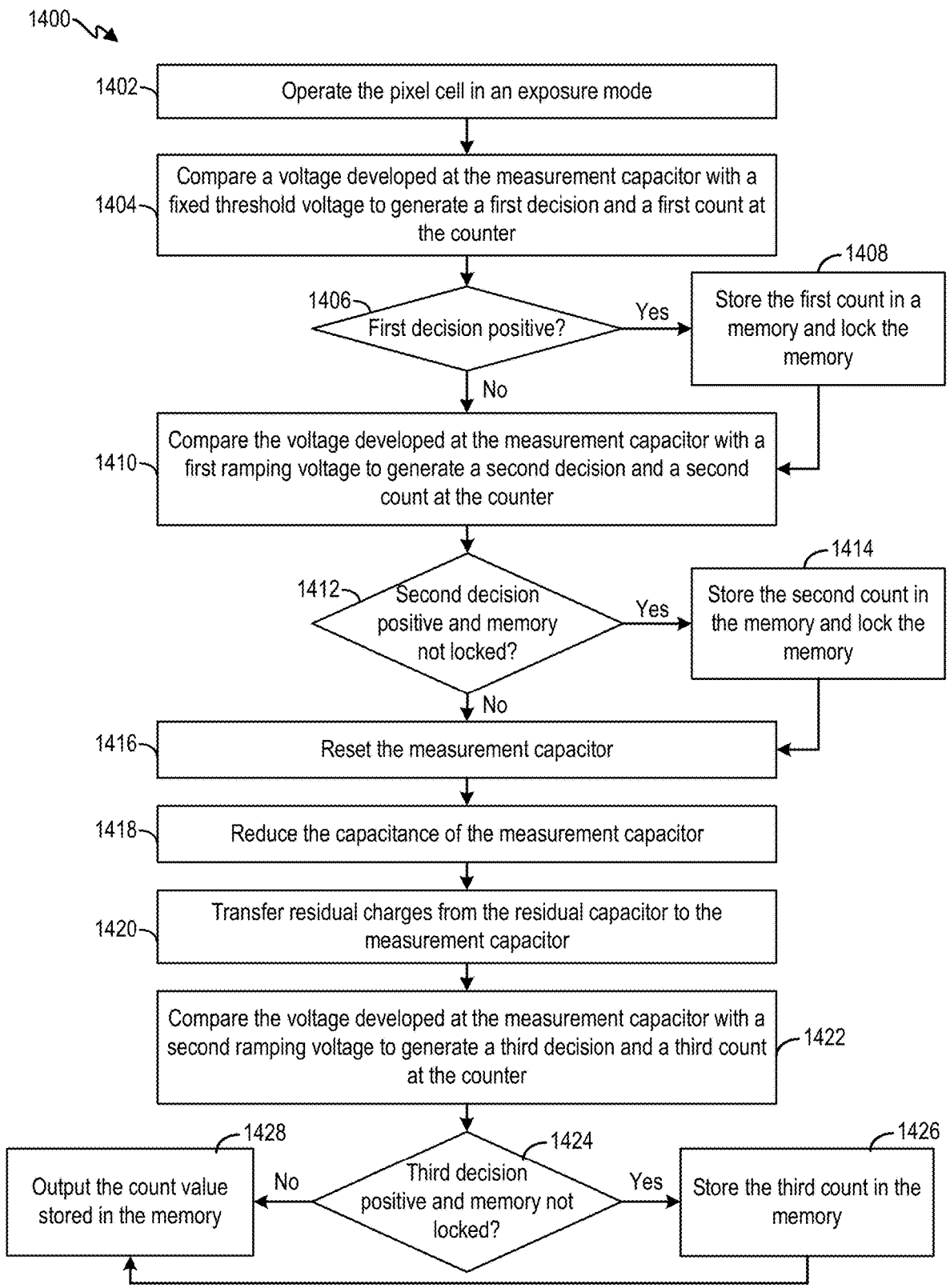
FIG. 14 illustrates an example plot of signal-to-noise ratios across a set of incident light intensity ranges achievable by embodiments of the present disclosure.

FIG. 14 illustrates an embodiment of a flowchart of a process 1400 for determining incident light intensity at a pixel cell (e.g., pixel cell 700, pixel cell 1100, etc.). Process 1400 can be performed by a controller together with various components of pixel cell 700 and pixel cell 1100. Process 1400 begins in step 1402, where the pixel cell is operated in an exposure mode where the photodiode can transfer charge to the residual charge capacitor and/or the measurement capacitor. In step 1404, the pixel cell can be operated to compare a voltage developed at the measurement capacitor with a fixed threshold voltage to generate a first decision and a first count at the counter. Step 1404 can be the first measurement phase targeted for a high light intensity range, and the first count can represent a time-of-saturation measurement. If the first decision is positive (in step 1406), the pixel cell can proceed to step 1408 and store the first count in a memory and then lock the memory by asserting a first flag (e.g., FLAG_1), and then proceed to step 1410 to perform the second measurement phase. If the first decision is not positive, the pixel cell can also proceed directly to step 1410 to perform the second measurement phase.

In step 1410, the pixel cell is operated to compare the voltage developed at the measurement capacitor with a first ramping voltage to generate a second decision and a second count at the counter. Step 1410 can be the second measurement phase for a medium light intensity range. The pixel cell can then determine whether the second decision is positive, and whether the memory is not locked (e.g., based on first flag, FLAG_1 remains de-asserted), in step 1412. If the second decision is positive and the memory is not locked, the pixel cell can proceed to step 1414 and store the second count in the memory and lock the memory by asserting a second flag (e.g., FLAG_2), and then proceed to step 1416 to perform the third measurement phase. If the first decision is not positive, the pixel cell can also proceed directly to step 1416 to perform the third measurement phase.

In step 1416, as part of the third measurement phase, the pixel cell can reset the measurement capacitor to empty the stored charge. The pixel cell can also reduce the capacitance of the measurement capacitor to increase the charge-to-voltage conversion ratio, in step 1418. In step 1420, the pixel cell can transfer residual charge stored in the residual charge capacitor of the photodiode to the measurement capacitor. The pixel cell then proceeds to step 1422 to compare the voltage developed at the measurement capacitor with a second ramping voltage to generate a third decision and a third count at the counter. The pixel cell then proceeds to determine whether the third decision is positive and whether the memory is not locked (e.g., based on whether any one of first flag FLAG_1 and second flag FLAG_2 is asserted), in step 1424. If the third decision is positive and the memory is not locked, the pixel cell stores the third count in the memory in step 1426, and then proceeds to step 1428 to output the count value stored in the memory. On the other hand, if the third decision is not positive, or the memory has been locked, the pixel cell will proceed directly to step 1428 to output the count value (which can be one of the first count or the second count) stored in the memory. In some examples, step 1428 can be performed at a later time, and step 1428 need not be performed immediately following step 1424 or 1426.

FIG. 15 illustrates an embodiment of a flowchart of a process 1500 for operating an array of digital pixel cells. The array of digital pixel cells may include, for example, an array of pixel cell 700, an array of pixel cells 1100, etc. Process 1500 can be performed by an image processor that interfaces with the array of digital pixel cells. Each digital pixel cell may perform process 1400 of FIG. 14 in parallel. For example, referring to FIG. 12A, each digital pixel cell can accumulate charge in the same exposure period (e.g., T1-T4) in parallel. Each digital pixel cell can perform time-to-saturation and OF charge quantization within the same exposure period in parallel. Each digital pixel cell can also perform PD charge quantization (e.g., between times T4 and T5) in parallel.

Process 1500 begins in step 1502, where the image processor may receive first digital outputs from memory devices of a first set of digital pixel cells of an array of digital pixel cells. The first digital outputs may be generated based on a quantity of charge generated by a photodiode of each of the first set of digital pixel cells in an exposure period. In some examples, the first digital outputs can be generated based on a time-of-saturation measurement (e.g., generated at step 1408 of process 1400) or a measurement of a total quantity of charge generated by the photodiode within the exposure period (e.g., generated at steps 1414 or 1426 of process 1400).

In step 1504, the image processor may determine, from the first set of digital pixel cells, a second set of digital pixel cells of which the first digital outputs satisfy one or more pre-determined conditions. The pre-determined conditions may include, for example, the first digital outputs indicating that the intensity of light received at the second set of digital pixel cells exceeds a saturation threshold (e.g., for detection of a glint patch, reflected infra-red light pattern, etc.), the first digital outputs including a pattern of pixel data or a light intensity distribution pattern representing an image feature of an object, etc. The determination of the second set of digital pixel cells can occur within the exposure period (e.g., based on the an indication of capacitor saturation from the time-to-saturation measurement, based on the quantity of charge at the OF node exceeding a threshold, etc.), or after the exposure period (e.g., based on the count value stored in the memory).

In step 1506, the image processor may identify, based on the second set of digital pixel cells, a third set of digital pixel cells from which to receive second digital outputs. The third set of digital pixel cells are part of the array of digital pixel cells, whereas the second digital outputs are generated based on a quantity of charge generated by a photodiode of each of the third set of digital pixel cells in the same exposure period (e.g., generated at steps 1408, 1414, or 1426 of process 1400). In some examples, the third set of digital pixel cells may correspond to the pixel locations of a region of interest (ROI) for detection of an object or an event. The ROI may be of a pre-determined shape (e.g., a rectangle shape, such as ROI 650) that encircles or overlaps with at least some of the second set of digital pixel cells. For example, ROI 650 can be determined as the smallest rectangular region that can encircle hand 642. In some examples, the ROI may also include a subset of the second set of digital pixel cells. In some examples, the ROI may not include the second set of digital pixel cells at all. For example, referring to FIG. 6B, the second set of digital pixel cells may include pixel cells corresponding to glitch 632, and the ROI may be configured to track the movement of part of pupil 634 which does not overlap with glint patch 632. In such a case, pixel cells that are at a pre-determined distance from glint patch 632 can be selected as ROI (and the third set of digital pixel cells).

In step 1508, the image processor may receive the second digital outputs from the memory devices of the third set of digital pixel cells. The second digital outputs may include, for example, count value representing a quantity of charge stored in the OF node (determined in step 1414 of FIG. 14), a quantity of charge stored in the photodiode (determined in step 1426 of FIG. 14), a time duration for the quantity of charge to exceed a saturation threshold (determined in step 1408 of FIG. 14), etc. The image processor may then perform one or more image processing operations based on the second digital outputs in step 1510. For example, the image processor may compare the pixel data included in the second digital output against a set of reference data representing a pre-determined object or event (e.g., hand 642 of FIG. 6C, glint patch 632 of FIG. 6B, etc.) to determine whether the second digital output (and the ROI) includes the pixel data of the pre-determined object or event.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
an array of pixel cells, each pixel cell including one or more photodiodes configured to generate a charge in response to incident light within an exposure period;
a quantizer configured to generate digital outputs for the array of pixel cells based on the charge generated by the array of pixel cells; and
an image processor configured to:

receive first digital outputs for a first subset of pixel cells of the array of pixel cells;

determine, from the first subset of pixel cells, a second subset of pixel cells of the array of pixel cells of which the first digital outputs satisfy one or more conditions;

determine a third subset of pixel cells of the array of pixel cells based on the third subset of pixel cells having one or more geometric relationships with the second subset of pixel cells;

receive second digital outputs generated by the third subset of pixel cells; and perform one or more image processing operations based on at least the second digital outputs.

2. The apparatus of claim 1, wherein the array of pixel cells comprise a grid of blocks of pixel cells; and wherein the first subset of pixel cells comprise one or more pixel cells selected from each block of pixel cells.

3. The apparatus of claim 1, wherein the one or more conditions comprise: the first digital outputs of the second subset of pixel cells exceeding a threshold.

4. The apparatus of claim 3, wherein the threshold is based on at least one of: an intensity of light associated with a glint of an eyeball, or an intensity of light reflected by a physical object.

5. The apparatus of claim 4, wherein the intensity of light reflected by the physical object comprises an intensity of infra-red light reflected by the physical object when illuminated by an infra-red illuminator.

6. The apparatus of claim 3, wherein the image processor is configured to determine that the first digital outputs of the second subset of pixel cells exceed the threshold based on most significant bits (MSBs) of the first digital outputs of the second subset of pixel cells.

7. The apparatus of claim 1, wherein the one or more conditions comprise: the first digital outputs of the second subset of pixel cells matching a pattern of pixel data corresponding to an image feature.

8. The apparatus of claim 1, wherein the one or more geometric relationships comprise: the third subset of pixel cells being at a particular distance from the second subset of pixel cells in the array of pixel cells.

9. The apparatus of claim 1, wherein the one or more geometric relationships comprise: the third subset of pixel cells forming a region that overlaps at least some of the second subset of pixel cells.

10. The apparatus of claim 9, wherein the one or more geometric relationships comprise: the third subset of pixel cells forming the smallest region having a particular shape that encircles the second subset of pixel cells.

11. The apparatus of claim 1, wherein the second digital outputs have a larger bit depth than the first digital outputs.

12. The apparatus of claim 1, wherein each pixel cell of the array of pixel cells includes a memory device to store a digital output based on the charge generated by the one or more photodiodes of the pixel cell; and wherein the image processor is configured to receive the first digital outputs and the second digital outputs from the memory devices of the pixel cells.

13. The apparatus of claim 1, further comprising a frame memory configured to store the first digital outputs and the second digital outputs; and wherein the image processor is configured to receive the first digital outputs and the second digital outputs from the frame memory.

14. The apparatus of claim 1, wherein the one or more photodiodes of each pixel cell of the array of pixel cells are configured to generate the charge in response to the incident light within the same global exposure period.

15. The apparatus of claim 14, wherein the image processor is configured to receive at least one of the first digital outputs or the second digital outputs before the global exposure period ends.

16. The apparatus of claim 14, wherein the image processor is configured to receive at least one of the first digital outputs or the second digital outputs after the global exposure period ends.

17. The apparatus of claim 1, wherein each pixel cell includes a capacitor to store the charge and to convert the charge to a voltage; and wherein the quantizer is configured to generate the digital outputs based on quantizing the voltages converted by the capacitors of the pixel cell.

18. The apparatus of claim 17, wherein the quantizer is configured to:

in a first measurement mode, determine whether the voltage converted by the capacitor of a pixel cell exceeds a threshold, and determine a time when the voltage exceeds the threshold to generate a first measurement;

in a second measurement mode, measure a level of the voltage to generate a second measurement; and generate, based on whether the voltage exceeds the threshold, a digital output for the pixel cell from one of the first measurement or the second measurement.

19. The apparatus of claim 18, wherein the capacitor includes a floating diffusion node.

20. A method comprising:

receiving first digital outputs for a first subset of pixel cells of an array of pixel cells, wherein each pixel cell of the array of pixel cells includes one or more photodiodes configured to generate a charge in response to incident light within an exposure period, and wherein the first digital outputs are part of the digital outputs generated by a quantizer based on the charge generated by the one or more photodiodes of the array of pixel cells;

determining, from the first subset of pixel cells, a second subset of pixel cells of the array of pixel cells of which the first digital outputs satisfy one or more conditions;

determining a third subset of pixel cells of the array of pixel cells based on the third subset of pixel cells having one or more geometric relationships with the second subset of pixel cells;

receiving second digital outputs generated by the third subset of pixel cells; and performing one or more image processing operations based on at least the second digital outputs.

* * * * *